(12) United States Patent
Yoshioka

(10) Patent No.: US 8,909,921 B2
(45) Date of Patent: Dec. 9, 2014

(54) SIGNATURE MANAGEMENT METHOD AND SIGNATURE MANAGEMENT DEVICE

(75) Inventor: Takashi Yoshioka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1199 days.

(21) Appl. No.: 12/269,474

(22) Filed: Nov. 12, 2008

(65) Prior Publication Data

US 2009/0208000 A1   Aug. 20, 2009

(30) Foreign Application Priority Data

Feb. 19, 2008   (JP) .................................. 2008-037444

(51) Int. Cl.
| | |
|---|---|
| H04L 29/06 | (2006.01) |
| H04L 9/00 | (2006.01) |
| G01R 31/28 | (2006.01) |
| G06F 7/00 | (2006.01) |
| H04N 21/835 | (2011.01) |
| H04N 7/167 | (2011.01) |
| H04N 21/2347 | (2011.01) |
| H04N 21/254 | (2011.01) |
| H04N 21/8352 | (2011.01) |
| H04L 9/32 | (2006.01) |

(52) U.S. Cl.
CPC .......... *H04N 21/835* (2013.01); *H04N 7/1675* (2013.01); *H04N 21/23476* (2013.01); *H04N 21/2541* (2013.01); *H04N 21/8352* (2013.01); *H04L 9/3247* (2013.01); *H04L 2209/60* (2013.01)
USPC .............. 713/160; 380/42; 714/726; 707/741

(58) Field of Classification Search
CPC . H04N 1/00567; H04L 9/3247; H04L 9/3236
USPC .............. 725/32; 382/100; 380/202; 713/160
See application file for complete search history.

(56) References Cited

U.S. PATENT DOCUMENTS 5,845,256 A * 12/1998 Pescitelli et al. ................... 705/4
6,075,669 A * 6/2000 Takayama ....................... 360/69
(Continued)

FOREIGN PATENT DOCUMENTS

| AG | 2008-178048 | 7/2008 |
|---|---|---|
| EP | 1 069 777 A1 | 1/2001 |

(Continued)

OTHER PUBLICATIONS

Yoshiki Higashikado et al.,"Partial Integrity Assurance Technology PIAT: An Application to Sender Domain Authentication", IEICE Technical Report, ISEC2007-64(Jul. 2007) The Institute of Electronics, Information and Communication Engineers, Jul. 13, 2007, vol. 107, No. 141, pp. 129-132.

(Continued)

*Primary Examiner* — Arvin Eskandarnia
*Assistant Examiner* — Margishi Desai
(74) *Attorney, Agent, or Firm* — Staas & Halsey LLP

(57) ABSTRACT

A signature management apparatus and method of cutting-out streaming data. The signature management apparatus includes a signature-related information preparing device which prepares signature-related information for streaming data, a signature-related information storage device which partitions a sequence header of the streaming data into stream header information needed for reproduction of the streaming data and user header information which a user can freely use for storage, and stores the signature-related information within the user header information in a form that allows no start code to emerge.

20 Claims, 30 Drawing Sheets

(56) References Cited

U.S. PATENT DOCUMENTS

| | | | |
|---|---|---|---|
| 6,108,783 A * | 8/2000 | Krawczyk et al. | 713/180 |
| 6,357,006 B1 * | 3/2002 | Pham et al. | 713/176 |
| 6,826,183 B1 * | 11/2004 | Itoi | 370/392 |
| 7,478,243 B2 * | 1/2009 | Bolosky et al. | 713/181 |
| 7,551,672 B1 * | 6/2009 | Tahara et al. | 375/240.01 |
| 7,584,347 B2 * | 9/2009 | El-Haj-mahmoud et al. | 713/1 |
| 7,623,673 B2 * | 11/2009 | Mercier | 382/100 |
| 7,881,467 B2 * | 2/2011 | Yachida et al. | 380/246 |
| 2002/0034255 A1 * | 3/2002 | Zetts | 375/240.26 |
| 2002/0062439 A1 * | 5/2002 | Cotugno et al. | 713/170 |
| 2002/0126872 A1 * | 9/2002 | Brunk et al. | 382/100 |
| 2002/0178360 A1 * | 11/2002 | Wenocur et al. | 713/170 |
| 2003/0123659 A1 * | 7/2003 | Forstrom et al. | 380/205 |
| 2003/0236981 A1 * | 12/2003 | Marmigere et al. | 713/168 |
| 2004/0003261 A1 * | 1/2004 | Hayashi | 713/187 |
| 2004/0068746 A1 * | 4/2004 | Mori et al. | 725/88 |
| 2004/0091111 A1 * | 5/2004 | Levy et al. | 380/202 |
| 2004/0255116 A1 | 12/2004 | Hane et al. | |
| 2005/0144636 A1 * | 6/2005 | Hirai | 725/35 |
| 2005/0193206 A1 | 9/2005 | Kunisa et al. | |
| 2005/0209969 A1 * | 9/2005 | Kanazawa et al. | 705/51 |
| 2005/0216770 A1 * | 9/2005 | Rowett et al. | 713/201 |
| 2006/0020808 A1 * | 1/2006 | Yachida et al. | 713/176 |
| 2006/0184686 A1 * | 8/2006 | Lecomte et al. | 709/231 |
| 2006/0184961 A1 * | 8/2006 | Lee et al. | 725/32 |
| 2006/0222203 A1 * | 10/2006 | Mercier | 382/100 |
| 2006/0248348 A1 | 11/2006 | Wakao et al. | |
| 2006/0282652 A1 * | 12/2006 | El-Haj-mahmoud et al. | 713/1 |
| 2007/0050713 A1 | 3/2007 | Yoshioka et al. | |
| 2007/0127726 A1 * | 6/2007 | Ellis et al. | 381/15 |
| 2007/0130627 A1 | 6/2007 | Yoshioka | |
| 2007/0198830 A1 * | 8/2007 | Imai | 713/156 |
| 2007/0198838 A1 * | 8/2007 | Nonaka et al. | 713/176 |
| 2008/0037783 A1 * | 2/2008 | Kim et al. | 380/241 |
| 2008/0133929 A1 * | 6/2008 | Gehrmann et al. | 713/179 |
| 2008/0172264 A1 * | 7/2008 | Hoefelmeyer | 705/7 |
| 2008/0215796 A1 * | 9/2008 | Lam et al. | 711/100 |
| 2008/0222153 A1 * | 9/2008 | Naresh et al. | 707/9 |
| 2009/0132814 A1 | 5/2009 | Yoshioka | |
| 2009/0138517 A1 * | 5/2009 | McLain et al. | 707/104.1 |
| 2009/0199232 A1 * | 8/2009 | Takeyama et al. | 725/33 |
| 2010/0031358 A1 * | 2/2010 | Elovici et al. | 726/24 |
| 2010/0185867 A1 * | 7/2010 | Izu et al. | 713/176 |
| 2010/0198978 A1 * | 8/2010 | Kobayashi et al. | 709/231 |

FOREIGN PATENT DOCUMENTS

| | | | |
|---|---|---|---|
| EP | 1 498 799 A2 | 1/2005 | |
| EP | 1 753 244 A1 | 2/2007 | |
| JP | 2003-229828 | 8/2003 | |
| JP | 2005-143094 | 6/2005 | |
| JP | 2005-236442 | 9/2005 | |
| WO | 02/51063 | 6/2002 | |
| WO | WO 2006/008847 | 1/2006 | |
| WO | 2006/043784 A1 | 4/2006 | |
| WO | 2008/015755 A1 | 2/2008 | |
| WO | 2008/018324 A1 | 2/2008 | |
| WO | WO 2010097540 A1 * | 9/2010 | G06K 9/00 |

OTHER PUBLICATIONS

Japanese Office Action issued Aug. 10, 2010 in corresponding Japanese Patent Application 2008-037444.

Takashi Yoshioka et al., "An Implementation of Partial Integrity Assurance Technology: PIAT for Audio and Video Data", The 2008 Symposium on Cryptography and Information Security, Collection of Papers, published by Institute of Electronics, Information and Communication Engineers, published on Jan. 22, 2008, 1D1-1, pp. 1 to 6.

M. Takenaka et al., "Enhancement on Framework of Partial Integrity Assurance Technology: PIAT" Computer Security Symposium 2006, Oct. 2006 pp. 561-566.

English Translation of the Japanese Office Action issued Dec. 1, 2009 in corresponding Japanese Patent Application 2008-037444.

Miyazaki K et al, "Invisibly sanitizable digital signature scheme", IEICE Transactions on Fundamentals of Electronics, Communications and Computer Sciences, Engineering Sciences Society, Tokyo, JP LNKD-DOI : 10. 1093/IETFEC/E91-A.1.392, vol. E91A, No. 1, Jan. 1, 2008, pp. 392-402.

Steinfeld R et al, "Content extraction signatures", Lecture Notes in Computer Science, Springer, DE, vol. 2288, Dec. 6, 2001 , pp. 285-304.

European Search Report dated Jun. 7, 2010 in corresponding European Patent Application 08170387.8.

* cited by examiner

SIGNATURE MANAGEMENT METHOD AND SIGNATURE MANAGEMENT DEVICE

CROSS-REFERENCE TO RELATED APPLICATIONS

This application is based upon and claims the benefit of priority of the prior Japanese Patent Application No. 2008-37444, filed on Feb. 19, 2008, the entire contents of which are incorporated herein by reference.

BACKGROUND

1. Field

The embodiments discussed herein are related to a computer-readable storage medium storing a signature management program, a signature management method and apparatus, and more particularly, to a signature management system and method enabled to specify part(s) to be extracted from original data of streaming data, such as moving pictures and aural data, which are subject to partial extraction (more specifically including alteration, extraction and sanitizing), ensuring legitimacy of the extracted data and permitting third party certification.

2. Description of the Related Art

In recent years, installation of security cameras in stores, on downtown streets and in condominiums and drive recorders on commercial vehicles has become a common practice, and moving pictures are used as legal evidence in an increasing number of cases. It is also becoming a matter of commonsense to record conversations between customers and operators for possible use as evidence and precautions against trouble in transactions or support services provided by telephone.

At present, when moving pictures or aural data are to be used as evidence, recorded video tapes, visual or aural files are presented as is. However, as the preservation of images and aural data is increasingly digitized, their alteration or editing becomes easier, and their use as evidence would require third party certification by signature, time stamp or the like. Actually, services and products which record voices of telephone operators with a time stamp are available in the market, and the needs for such techniques are expected to increase in the future.

On the other hand, in connection with the expanding use of security cameras, protection of privacy against the use of images taken by such cameras is much argued.

At the same time, the use of private information is strictly limited, and if so required by the person concerned, disclosure or partial deletion of such information may be required in some cases.

To address this requirement for compatibility between availability of evidence and privacy protection, research is advancing on securing of partial originality (integrity) of electronic documents and sanitizing signature techniques for keeping confidentiality (sanitization).

SUMMARY

According to an aspect of the embodiment, a signature management apparatus for partially cutting out streaming data. The apparatus includes a signature-related information preparing device which prepares signature-related information for streaming data, a signature-related information storage device which partitions a sequence header of the streaming data into stream header information needed for reproduction of the streaming data and user header information which a user can freely use for storage, and stores said signature-related information within the user header information in a form that allows no start code to emerge.

It is to be understood that both the foregoing general description and the following detailed description are exemplary and explanatory only and are not restrictive of the invention, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
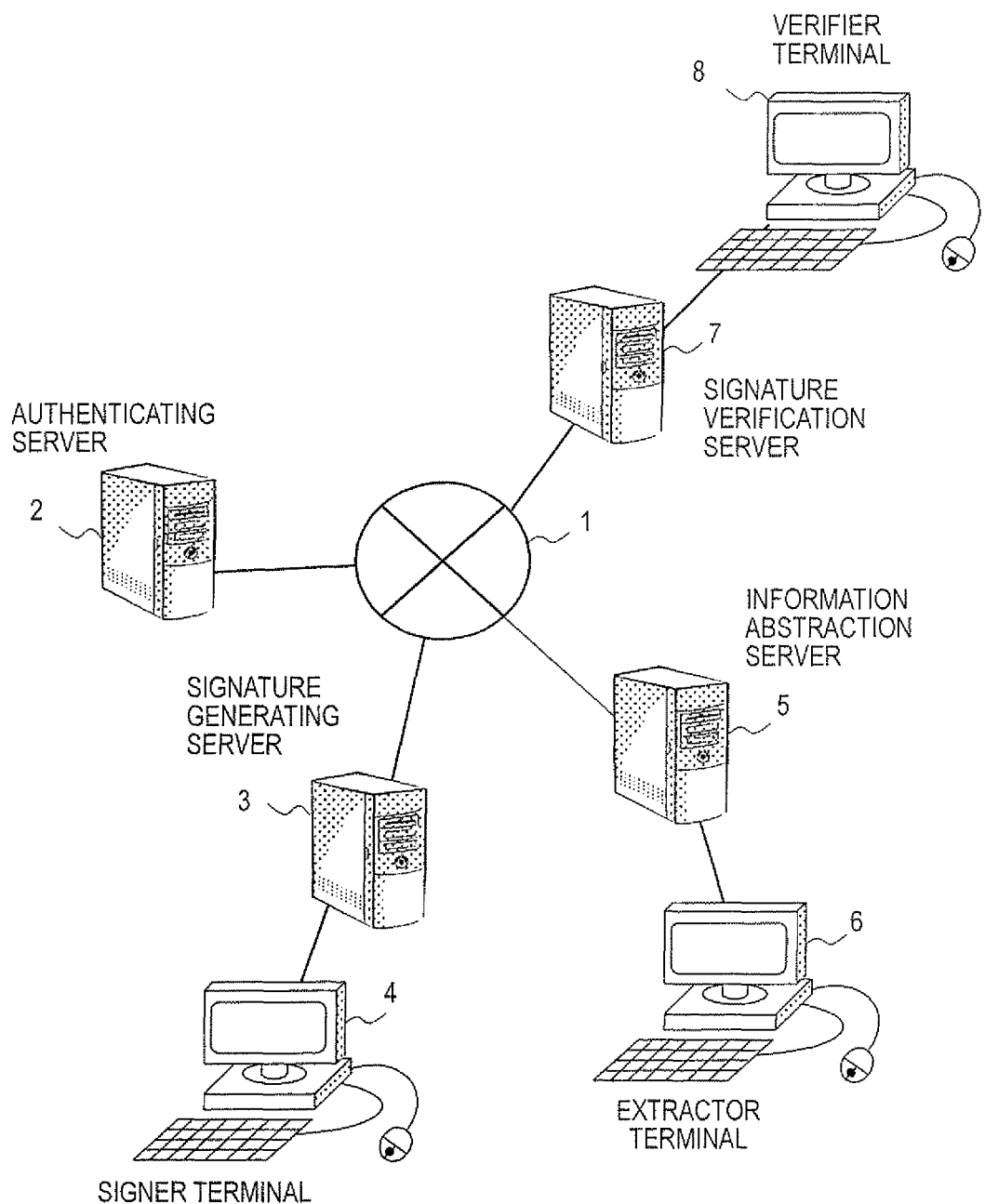
FIG. 1 shows a system configuration of a signature management system in an embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

An exemplary embodiment of this invention is described below with reference to the accompanying drawings.

First, a configuration of a signature management system in an embodiment is described with reference to FIG. 1.

In FIG. 1, reference numeral 1 denotes a network. The concept of the network here covers all communication line networks including the Internet, Intranet and wide area networks. Reference numeral 2 denotes a server of an authenticating body managing digital signature information. In verification by digital signature, signature information derived by summarizing information to be signed (digesting the message) and encrypting it with the sending party's secret key, the information to be signed and a public key certificate are transmitted to the other party. The recipient, after confirming the validity of the public key certificate, decrypts the encrypted signature information with the public key contained in the public key certificate, and compares it with the digested message obtained from the information to be signed; if this comparison proves identity of the signature information with the digested message, the received information is verified to have come from a legitimate party (details will be described afterwards).

Figure 2:
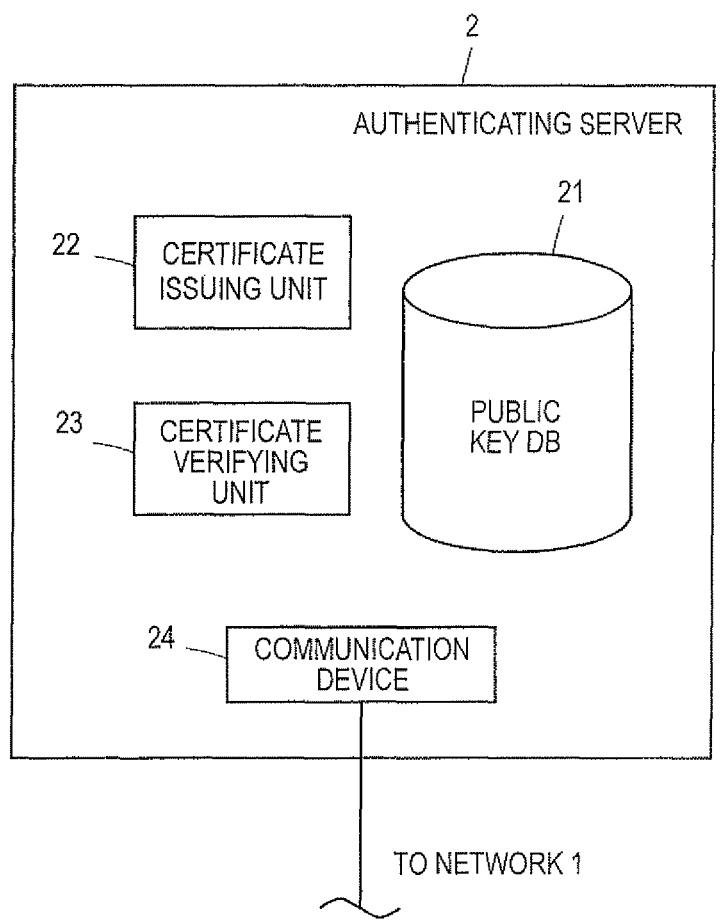
FIG. 2 shows a system configuration of an authenticating server in an embodiment.

Since this technique requires assurance of the legitimacy of the certificate, usually an authenticating server 2 in which public keys of the signer and the extractor are accumulated (stored) is installed as in this embodiment. This authenticating server 2, as shown in FIG. 2, has a public key DB 21 in which public keys of the signer and the extractor are accumulated, a certificate issuing unit 22 which issues a public key certificate upon request, a certificate verifying unit 23 which verifies a public key certificate and a communication device 24 which performs communication via the network 1.

Figure 3:
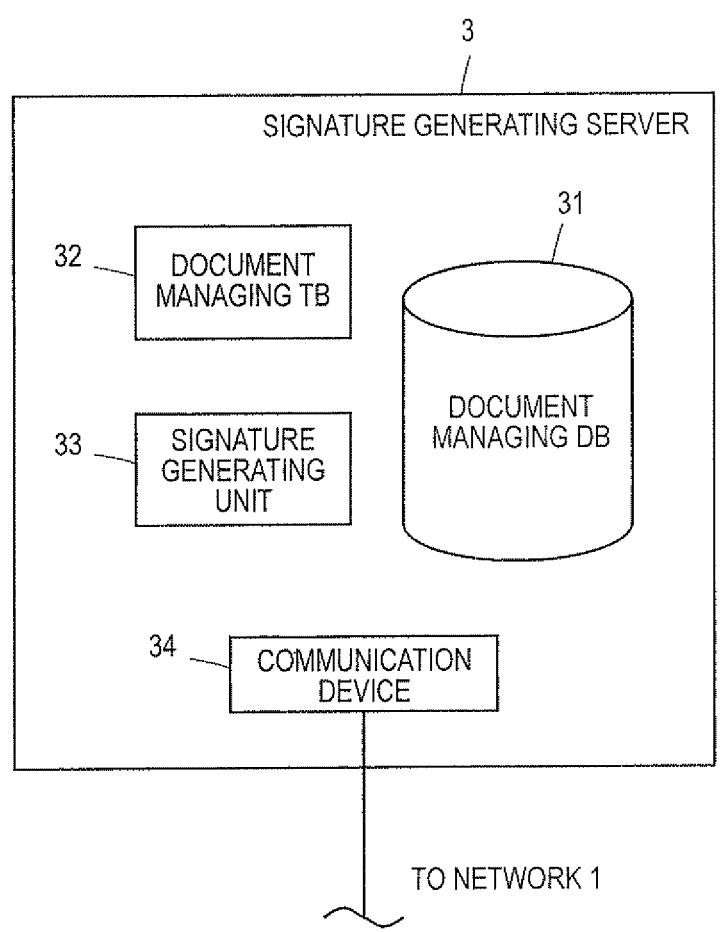
FIG. 3 shows a system configuration of a signature generating server in an embodiment.

Reference numeral 3 denotes a signature generating server with which the signer performs processing. The signature generating server 3, as shown in FIG. 3, has a document managing DB 31 in which information transmitted to an information abstraction server 5 (FIG. 1) to be described afterwards is accumulated, a document managing TB 32 which controls access to the document managing DB 31, a signature generating unit 33 which adds to information the signer's PIAT (Partial Integrity Assurance Technology) signature information and digital signature, and a communication device 34 which performs communication via the network 1.

Incidentally, PIAT refers to a signature technique which solves the problem that a signature affixed to an electronic document is made unverifiable by partial concealment of that electronic document. By applying PIAT, signed electronic documents, even in a sanitized state, are enabled to undergo effective signature verification and, moreover, third party certification that they involve no alteration elsewhere than sanitized (or altered or added) parts.

Reference numeral 4 denotes a terminal to allow the signer to operate the signature generating server 3. The signer terminal 4 can communicate with the signature generating server 3.

Figure 4:
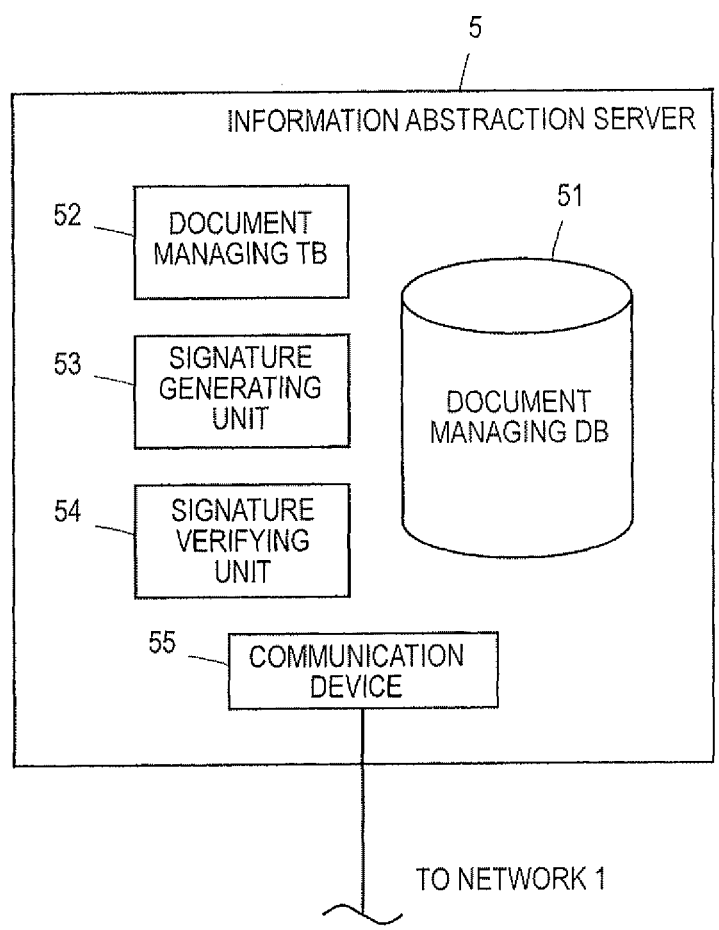
FIG. 4 shows a system configuration of an information extracting server in an embodiment.

Reference numeral 5 denotes an information abstraction server. The information abstraction server 5, as shown in FIG. 4, has a document managing DB 51 in which information transmitted from the signature generating server 3 is accumulated and information to be transmitted to a signature verification server 7 (described in detail below) afterwards is to be accumulated, a document managing TB 52 which controls access to the document managing DB 51, a signature generating unit 53 adds to information the extractor's PIAT signature information and digital signature, a signature verifying unit 54 which verifies the digital signature to be added to the transmitted information, and a communication device 55 for performing communication via the network.

Reference numeral 6 denotes a terminal to allow the extractor to operate the information abstraction server 5. The extractor terminal 6 can communicate with the information abstraction server 5.

Figure 5:
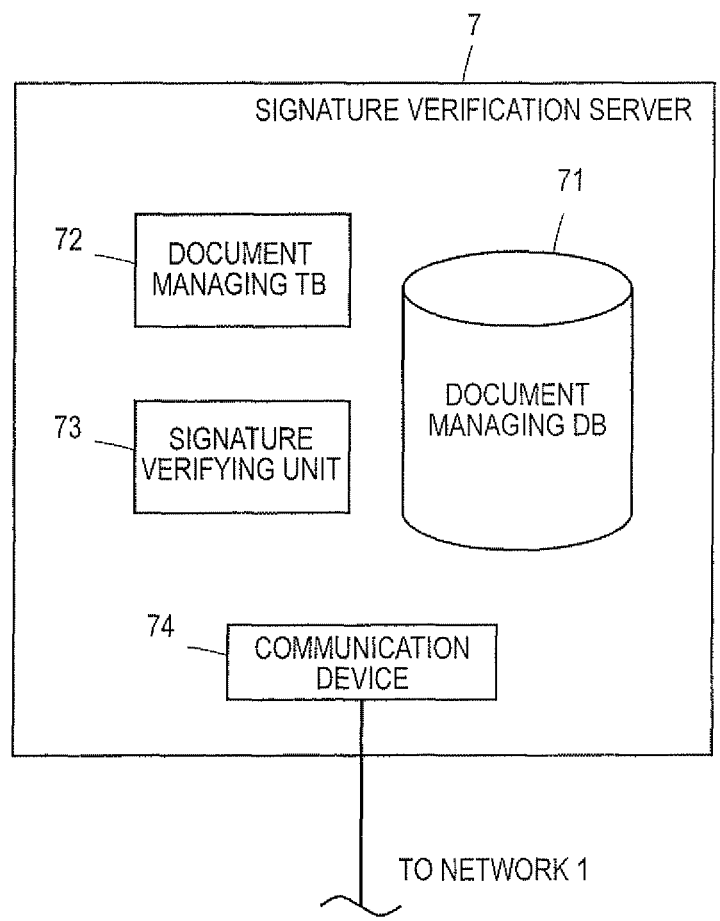
FIG. 5 shows a system configuration of a signature verifying server in an embodiment.

Reference numeral 7 denotes a signature verification server. The signature verification server 7, as shown in FIG. 5, has a document managing DB 71 in which information transmitted from the information abstraction server 5 is accumulated, a document managing TB 72 which controls access to the document managing DB 71, a signature verifying unit 73 which verifies the digital signature to be added to the transmitted information and PIAT signature information, and a communication device 74 for performing communication via the network 1.

Reference numeral 8 denotes a terminal to allow the verifier to operate the signature verification server 7. The verifier terminal 8 can communicate with the signature verification server 7.

Incidentally, the signature generating unit 33 of the signature generating server 3 and the signature generating unit 53 of the information abstraction server 5 constitute the signature-related information generating device and the signature-related information storage device for the present invention.

Processing by the system configured as described above is described below.

First, processing of a digital signature will be described.

When a digital signature is to be used, a sender generates a pair of keys (a secret key and a public key) in advance, transmits the public key to the authenticating server 2 to have a public key certificate issued, and stores the secret key and public key certificate in a transmitting device. When information is to be transmitted from the transmitting device, first a summarized version (digest message) of the information to be signed is generated, and a version of the summarized information encrypted with the sender's secret key is used as signature information. Then, the information to be signed, the signature information and the sender's public key certificate are transmitted to the other party, and the other party having received them (the recipient) checks with the authenticating server 2 the validity of the acquired public key certificate of the sender; if it is found valid, the signature information is decrypted with the public key. Then, a summary of the information to be signed is generated and compared with the decrypted; if they are found the same, the certificate can be proved to be what was truly transmitted from the sender and to be unaltered.

The summarized information here is information figured by applying a cryptographically unidirectional hash function to the information to be signed (hash information), and is also known as a message digest in the sense that the size of the information to be signed can be compressed. Hash information generated by applying the cryptographically unidirectional hash function has a characteristic that the hash information is the only relevant information that can be generated from nothing else than that information to be signed and the original information cannot be restored from the generated hash information. For this reason, it is often used for encryption of information or generation of digital signatures. This cryptographically unidirectional hash function has such algorithms as MD5, SHA-1 and SHA-256. Information regarding which algorithm is applied to information to generate digest information (hash information) (hash information generating algorithm) is stated in the public key certificate.

A detailed procedure of digital signature generation is described below.

Figure 6:
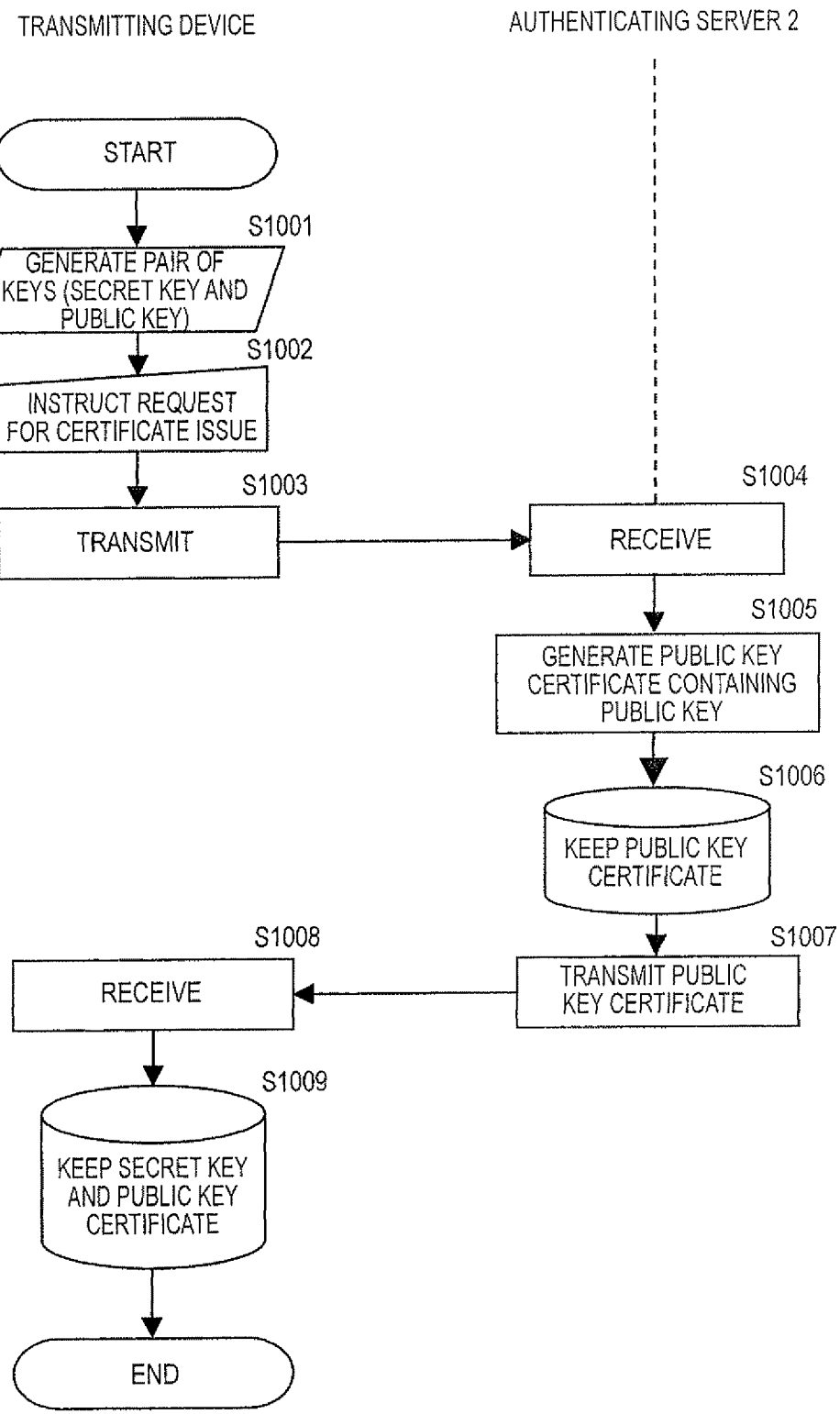
FIG. 6 is a flow chart showing a processing of registration of a public key between a transmitting device and an authenticating server in an embodiment.

First, the registration of the public key between the transmitting device and the authenticating server 2 will be described with reference to the flow chart of FIG. 6.

In the system shown in FIG. 1, the signature generating server 3 and the information abstraction server 5 constitute the transmitting device for the digital signature.

First, the sender generates a pair of keys (a secret key and a public key) (S1001). Then, the sender operates the transmitting device to input information on a request for a certificate issue (S1002), and the transmitting device transmits to the authenticating server 2 the inputted certificate issue request information together with the public key (S1003).

The certificate issuing unit 22 of the authenticating server 2 having received this information with the communication device 24 (S1004), generates a public key certificate containing the public key (S1005), and accumulates the generated public key certificate in the public key DB 21 (S1006).

After that, the certificate issuing unit 22 controls the communication device 24 to transmit the issued public key certificate via the network 1 to the transmitting device having transmitted the certificate issue request information (S1007).

The transmitting device having received this information (S1008) accumulates the secret key generated at S1001 and the public key certificate issued by the authenticating server 2 into memory device(s) it possesses (for example, a storage area in the signature generating unit 33 of the signature generating server 3 and a storage area in the signature generating unit 53 of the information abstraction server 5) (S1009), and completes its processing.

Figure 7:
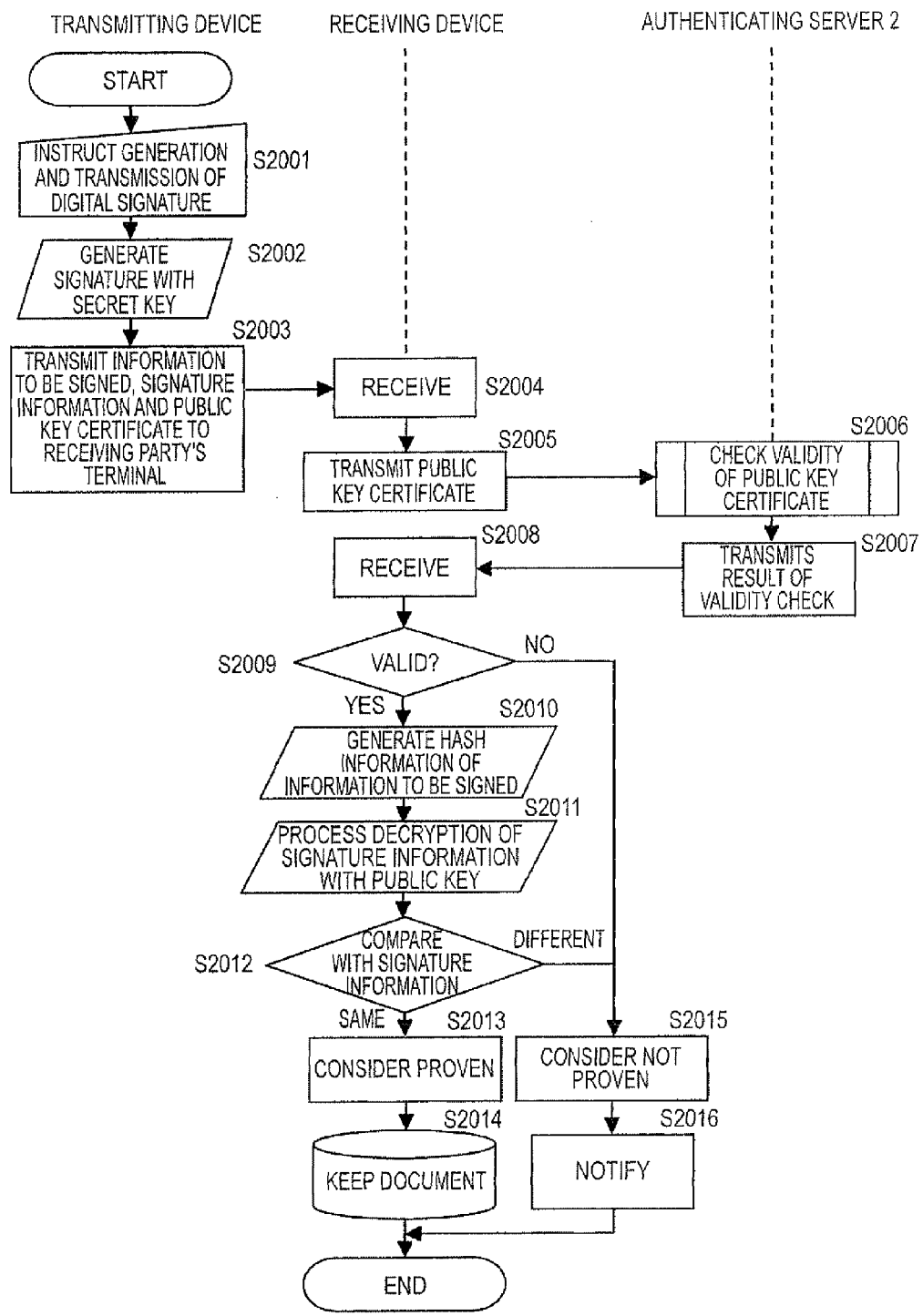
FIG. 7 is a flow chart showing the processing of transmission/reception of electronically signed information and the processing of verification of a receiving device in an embodiment.

Next, the processing to transmit/receive the electronically signed information and the verification processing by the receiving device is described with reference to the flow chart of FIG. 7.

First, when the sender inputs instruction(s) to generate digital signature for certain information to be signed to transmit it to the receiving device (S2001), the transmitting device encrypts the digest information (hash information) of the information to be signed indicated by the secret key stored in the storage areas (S2002), and transmits it to the receiving device together with the public key certificate similarly stored (S2003).

The receiving device having received these items of information (S2004) first transmits the public key certificate to the authenticating server 2 to check the term of validity, expiration information, if any, and so forth regarding the transmitted public key certificate (S2005). Here, the authenticating server 2 is supposed to support a series of functions for certificate issuance and certificate verification. Next, the authenticating server 2 checks the validity of the received public key certificate (S2006), and transmits the result of validity check to the receiving device (S2007). The receiving device having received this result of validity check (S2008) checks whether or not the public key certificate is valid (S2009); if its validity is confirmed, the receiving device first references the hash information generating algorithm contained in the sender's public key certificate acquired from the transmitting device, and generates hash information from the information to be signed received from the transmitting device (S2010). Then, utilizing the public key contained in the public key certificate, the receiving device processes decryption of the signature information received from the transmitting device (S2011). The receiving device compares (S2012) the hash information generated at S2010 and the information obtained by decryption at S2011 to determine whether or not they are the same. If they are determined to be the same, the decrypted information is considered to have been proven that it is the information transmitted from the transmitting device (the sender) and free from alteration (S2013), and these items of information are preserved (S2014).

On the other hand, if the hash information and the information obtained by decryption are found to be different from each other, the decrypted information is considered to have failed to prove ascribable to the transmitting device (the sender) (or to have undergone alteration on the way of communication, of the like) (S2015), and notification to the operator of the receiving device is provided by displaying the failure to prove (validate) or otherwise (S2016). If the processing at S2009 fails to confirm the validity of the public key certificate, similarly the decrypted information is considered to have failed to prove ascribable to the transmitting device (the sender) (S2015), and notification to the operator of the receiving device is processed by displaying the failure to prove or otherwise (S2016).

Figure 8:
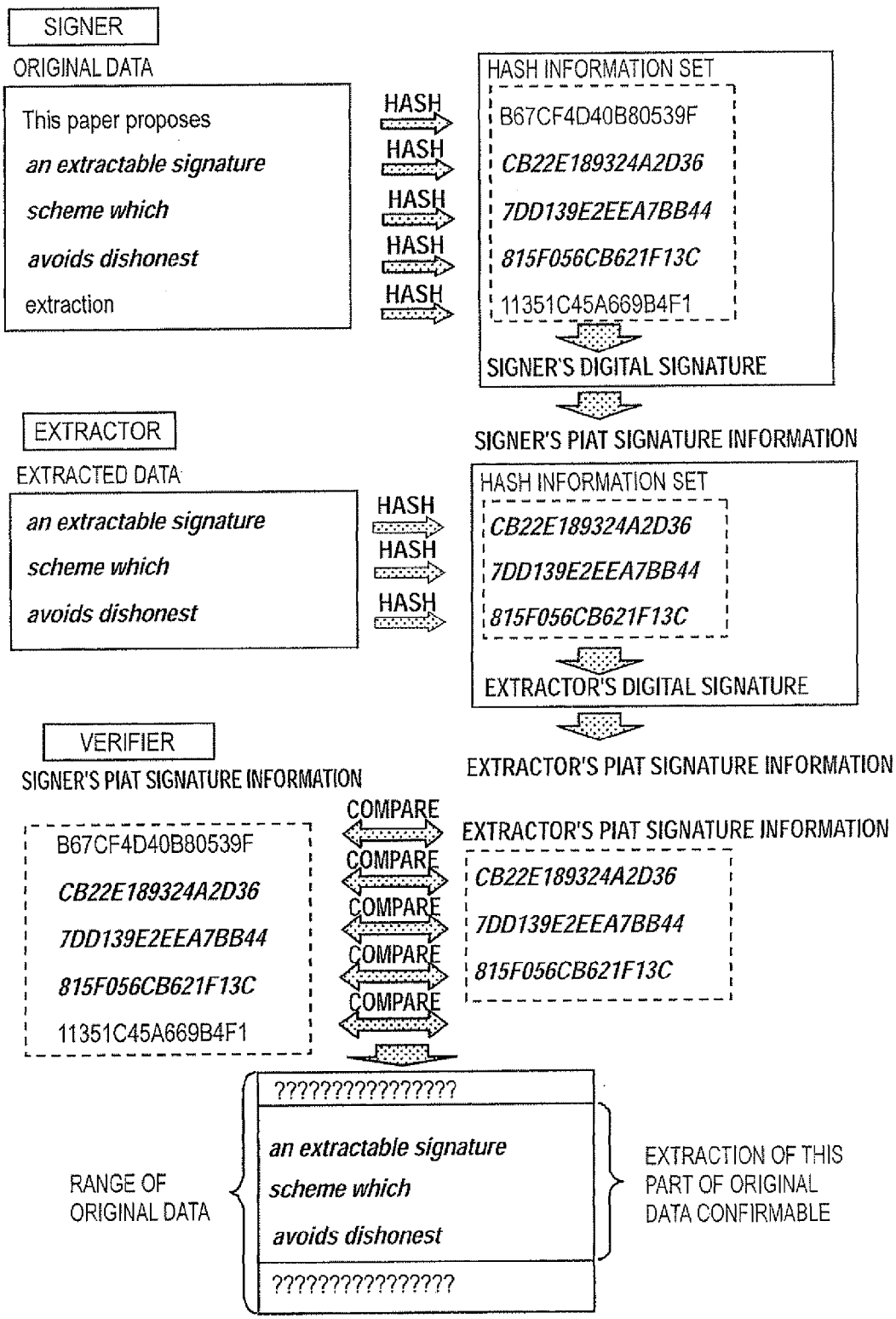
FIG. 8 outlines the algorithm of PIAT.

Hereupon, an algorithm of PIAT will be outlined with reference to FIG. 8.

The signer splits the data to be signed into data parts, and calculates hash information in the data parts to produce a hash information set. After that, the signer affixes a digital signature corresponding to the signer to the hash information set produced, and the hash information set and the digital signature together constitute PIAT signature information.

The extractor extracts a data part from the data to which the signer applied the PIAT signature information (and deletes all other data parts). After that, the extractor performs similar operations as the signer did to produce the extractor's PIAT signature information.

The verifier first checks the integrity of the hash information set from the signer's PIAT signature information and the extractor's. Next, the verifier produces a hash information set from the disclosed data part and verifies its identity with the hash information set contained in the extractor's PIAT signature information. Finally, by comparing the signer's hash information set and the extractor's, the verifier ascertains the same part in the hash information represents the position of extraction from the original data. If the hash information of the extracted data is found absent in the hash information of the signer's PIAT signature information, it means that the data part has been altered.

Next, streaming information for which an embodiment is intended is described and defined. Typical moving picture formats include MPEG1/2/4 and typical audio formats, MP3 (MPEG1 Audio Layer-3) and WAV. In the description of this embodiment, MPEG1 will be taken up as example.

While a variety of MPEG1 formats are available for use, here is supposed application to moving pictures whose images are relatively monotonous and, for the sake of simplification, application to MPEG1 video frames cleared of audio portions in a CBR (Constant Bit Rate) system of Elementary Stream handling only MPEG1-encoded images will be considered. The applicable format will be hereinafter referred to as simply MPEG1.

Figure 9:
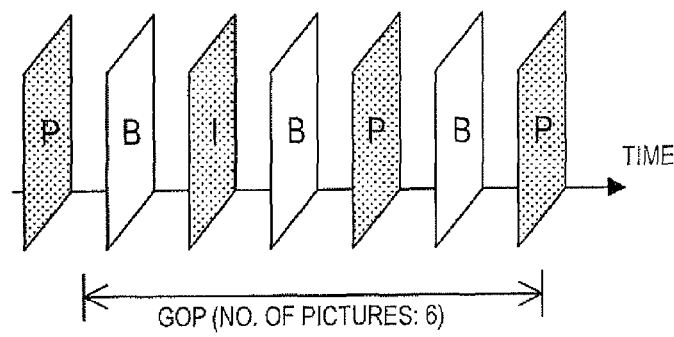
FIG. 9 shows picture types of MPEG1 and an example of arrangement of the same.

MPEG1 is a moving picture encoding technique authorized under the ISO/IEC 11172-2. A moving picture is realized by displaying still pictures at a relatively high speed. For instance in television, about 30 pictures of a second are displayed, and the number of pictures displayed per second is referred to as the frame rate. By the technique of encoding moving pictures, (still) picture compression by coding and compression by inter-frame predictive encoding are performed to reduce the volume of data involved. MPEG1 uses the DCT technique for the compression of still pictures and the bidirectional prediction technique for the inter-frame predictive encoding. For the bidirectional prediction, three types of still picture holding methods are available for MPEG1. FIG. 9 shows picture types of MPEG1 and an example of arrangement of the same.

An I frame holds in a compressed form all the picture data needed for displaying. A P frame, known as an inter-frame predictive-encoded picture, references the picture of the I frame or the P frame decoded immediately before, and holds only the value of the difference and the like therefrom. A B frame references the pictures of I frame and the P frame decoded in the immediate future and past, and holds the values of the differences and the like therefrom, P frames and B frames reduce redundancy in the direction of time by using the differences from the picture before and after, and thereby realize a high degree of data compression. Also in MPEG1, a number of pictures put together constitute the smallest set of moving pictures known as GOP (Group Of Pictures) as shown in FIG. 9. Moving pictures can be independently reproduced in GOP units; this is a structure to enable moving pictures to be reproduced or edited on the way of a sequence.

Figure 10:
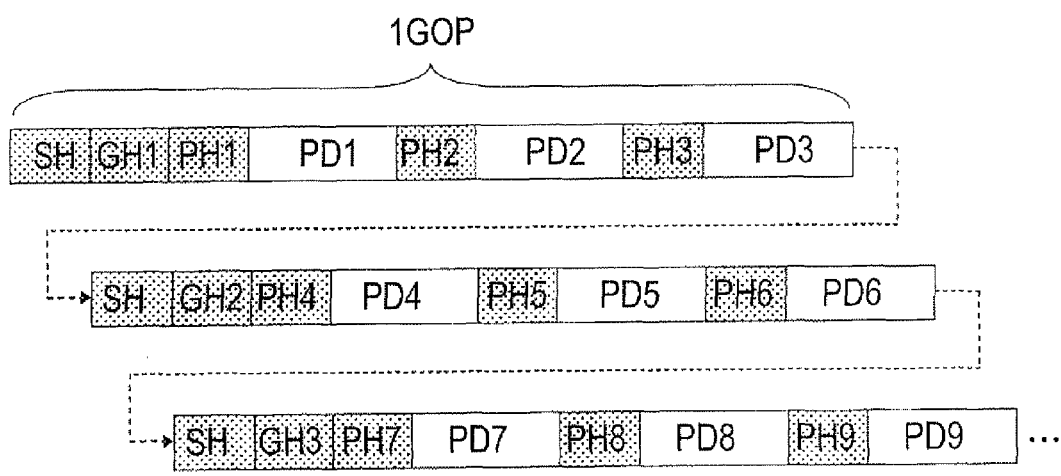
FIG. 10 shows an example of video frame configuration of MPEG1 in an embodiment.
Figure 11:
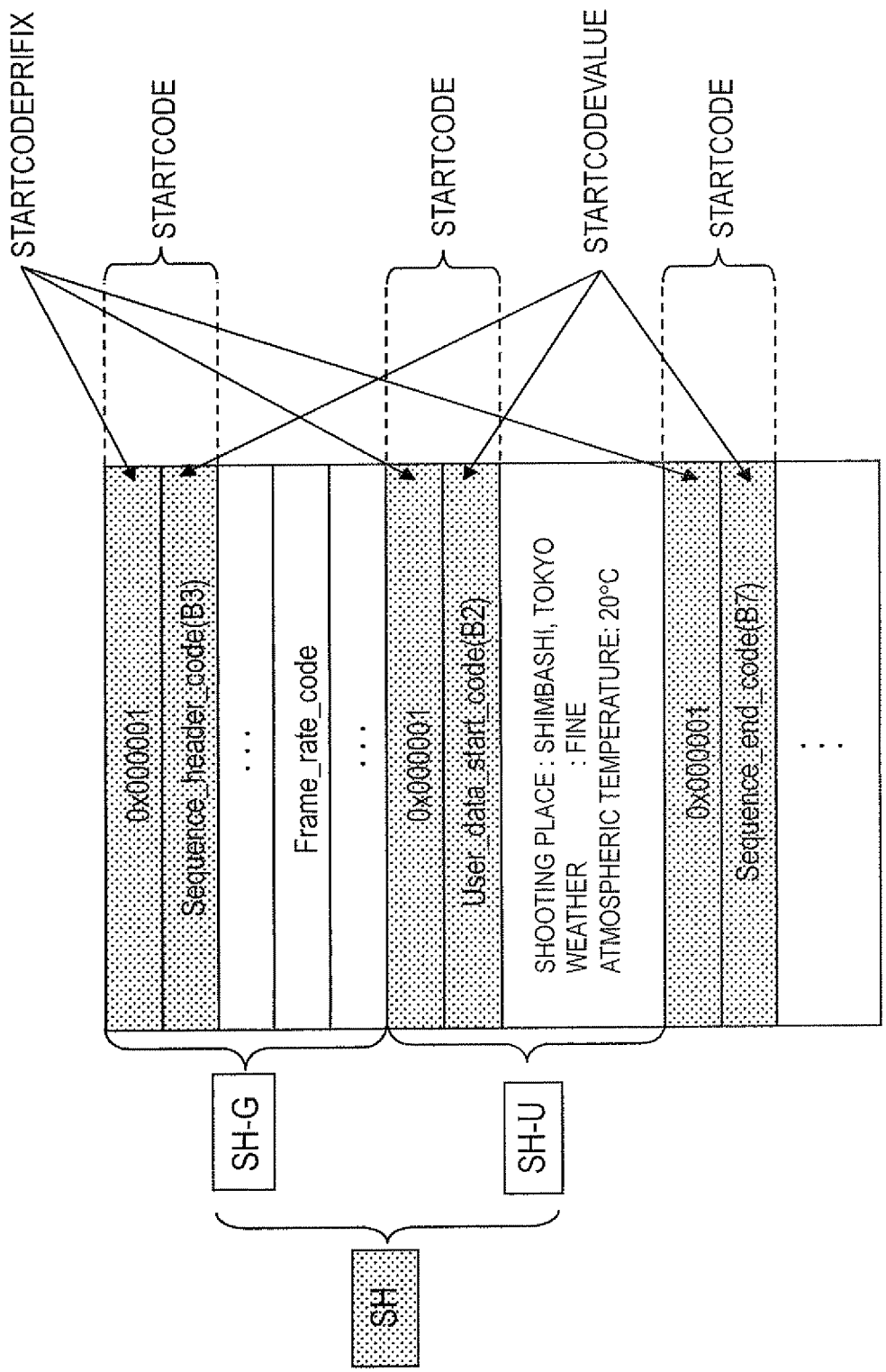
FIG. 11 shows a structure of a sequence header.

FIG. 10 shows an example of frame configuration of MPEG1 in an embodiment. A video frame of MPEG1 comprises a sequence header (SH), a GOP header (GH), picture headers (PH) and picture data (meaning data of the layer following a PH; hereinafter abbreviated to PD). In particular, the SH records common parameters of the whole video sequence including information representing the picture size, the number of frames encoded per second and the communication speed. Further, FIG. 11 shows the structure of an SH. An SH is divided into an area, denoted by SH-G in FIG. 11, necessary for reproduction, decoding and other processing of streaming data (hereinafter referred to as stream header information) and an area, denoted by SH-U in FIG. 11, which the user can store information as the user desires (hereinafter referred to as user header information). Even if this user header information is not contained in SH, if there is stream header information, streaming data can be reproduced and decoded. Also, a three byte start code prefix (STARTCODE-PRIFIX) in which "0x000001" is recorded and one byte start code values (STARTCODEVALUE) in which "B3", "B2", "B7" and so forth are recorded are stored, and these START-CODEPRIFIX and STARTCODEVALUE are collectively referred to as four byte STARTCODE, "0x000001XX"), The role of this start code is described below. The pertinent standard prescribes that a start code should be provided in every case to enable streaming data to be correctly analyzed and decoded (reproduced), More specifically, the start code indicates the type of syntax on which the encoding is based, and the decoder analyzes the streaming data on the basis of this start code. The bit string "0X000001XX" is defined to be prohibited from appearing in the bit string except as the start code, and the decoder is enabled to start decoding by finding a correct "0x000001XX". Conversely, if no start code is found, it cannot be determined where the stream is split, and therefore the syntax on which the encoding of the bit string referenced cannot be identified, therefore making the decoding impossible.

Now, application of PIAT to MPEG1 by the system in an embodiment is described with reference to the flow charts of FIG. 12 through FIG. 16. In an embodiment, three operators including the signer, extractor and verifier are involved. The signer signs the original moving picture information which is the object, the extractor extracts that original moving picture information, and the verifier verifies the disclosed cut-out moving picture information.

The following conditions are provided regarding the signer, extractor and verifier. Whereas the signer warrants contents of the original moving picture information to be signed by signing it, to the signer signs it under the condition indicating that what part of the object original moving picture information is unknown. The extractor partially extracts data from the original moving picture information signed by the signer, and discloses the partial information to the verifier as cut-out moving picture information. There are two different extracting methods; one is extractor-identified extraction by which information of the extractor is disclosed at the same time to make known who processed that extraction, while the other is anonymous extraction by which the extractor is not identified.

The following description of an embodiment assumes extractor-identified extraction. The verifier checks whether or not the disclosed cut-out moving picture information is warranted by the signer. It is verified not only that the disclosed cut-out moving picture information is part of the original moving picture information signed by the signer but also that its extraction was performed by the extractor. Incidentally, for the processing of the digital signature, each device performs the procedure for the digital signature described above.

Figure 12:
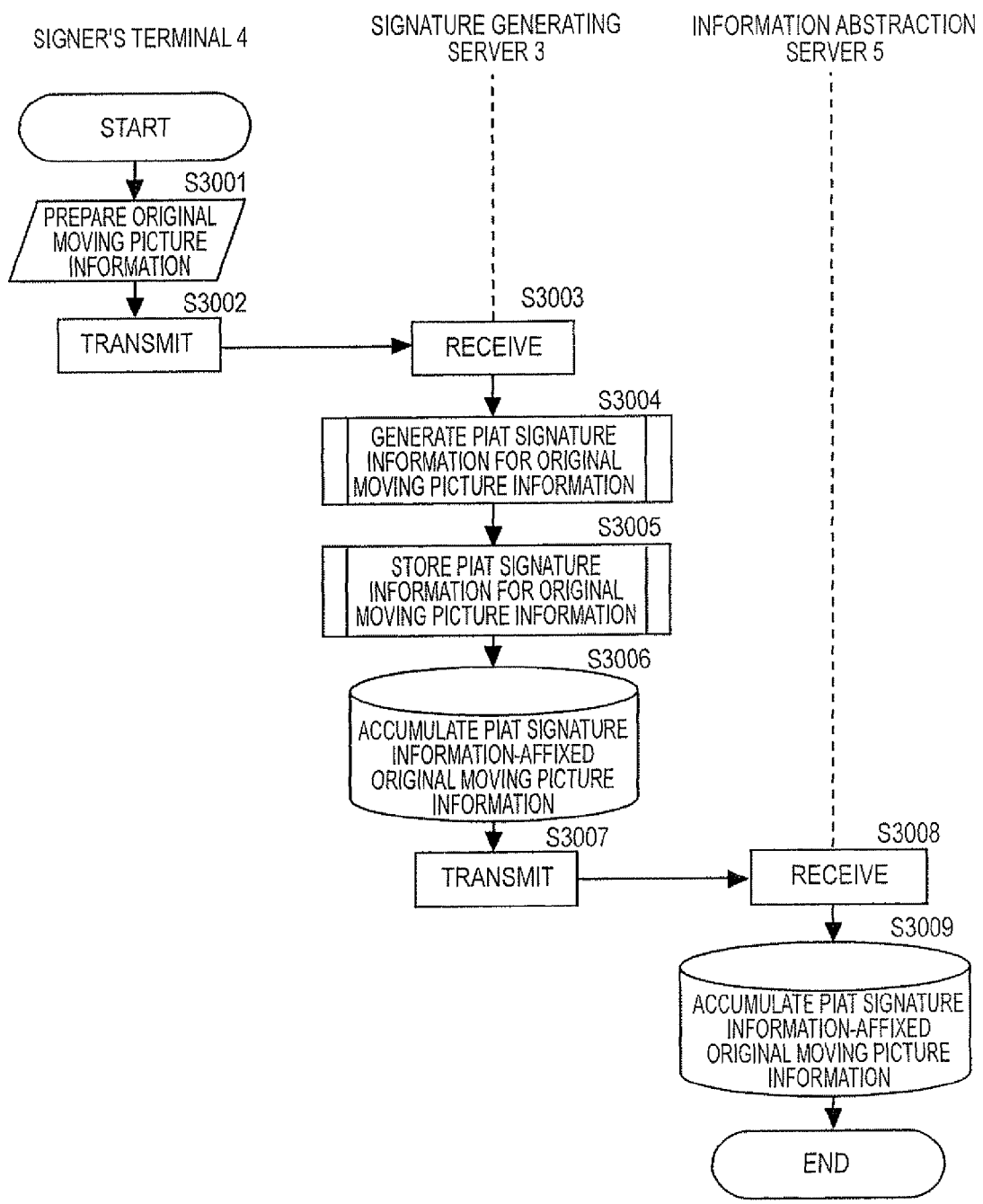
FIG. 12 is a flow chart showing a processing of signature generation in an embodiment

As charted in FIG. 12, the signer first prepares the original moving picture information to be signed by using the signer terminal 4 (S3001). When the original moving picture information has been completed, the prepared original moving picture information is transmitted to the signature generating server 3 (S3002). The signature generating server 3, having received the original moving picture information (S3003), begins processing by splitting the original moving picture information into partial information. When the data of MPEG1 are to be split into data parts to facilitate extraction, conceivably extraction may be restricted because the use of the inter-frame predictive encoding technique eliminates PD-by-PD independence. In view of this problem, according to the invention, the SH is placed in the leading position, the data until the PD immediately before the next SH (or in the absence of SH the next GH) are supposed to constitute one GOP (the data part of MPEG1) in the frame configuration shown in FIG. 10 and, for the sake of simplification, the data are split into data parts in GOP units.

Since the purpose is to extract moving picture data, it is presupposed in an embodiment to cut out one sequence of consecutive moving pictures out of all the data.

Figure 17:
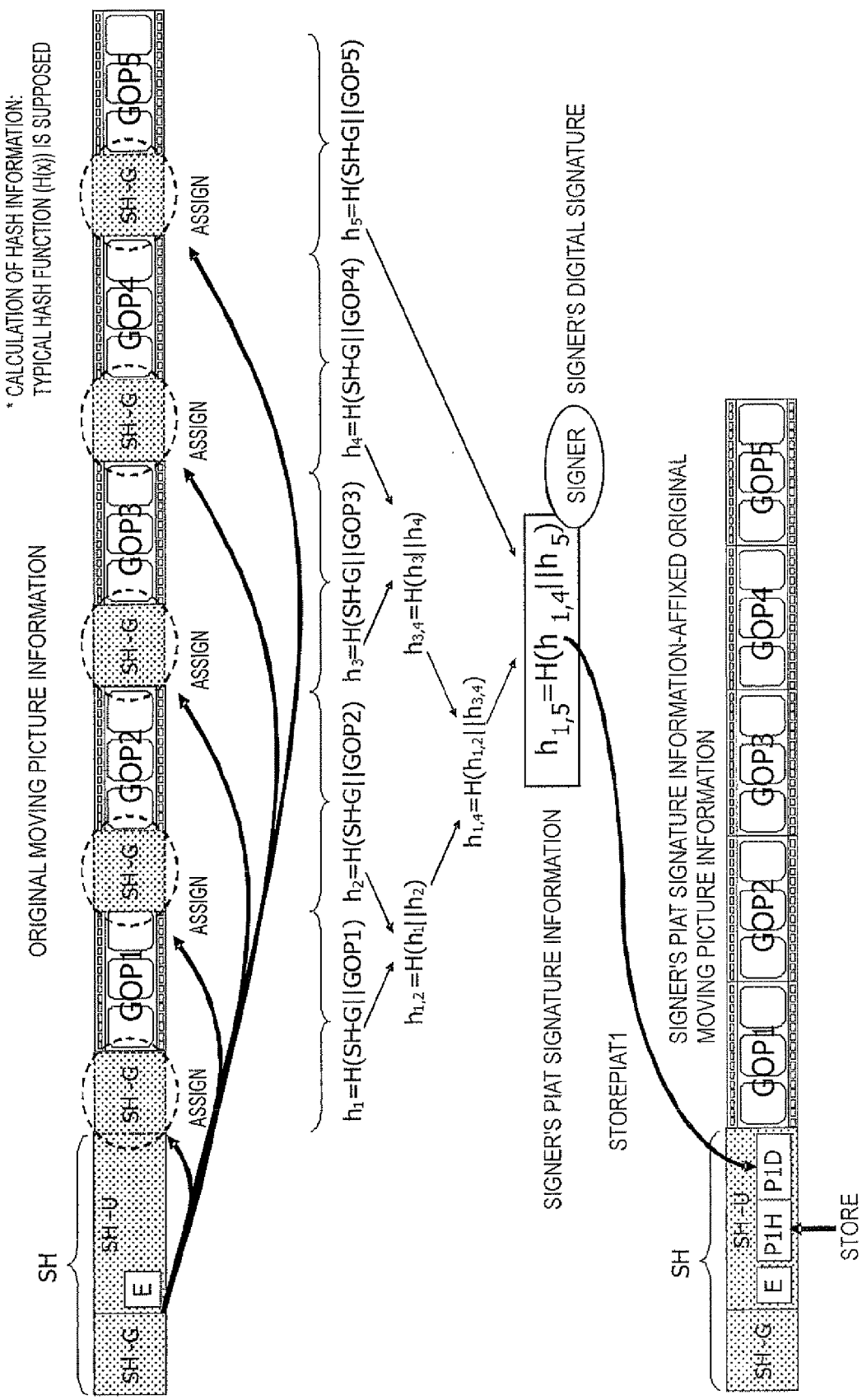
FIG. 17 shows a method of generating signature for original moving picture information in an embodiment.

The signature generating unit 33 generates PIAT signature information for the original moving picture information (S3004). FIG. 17 shows how PIAT signature information for the original moving picture information is generated. When PIAT signature information is to be generated for original moving picture information, the method of generating PIAT signature information differs with user header information (SH-U) in the SH and is also to be covered by originality warrant. FIG. 17 shows a case in which originality warrant does not cover the user header information but covers only stream header information (SH-G). Incidentally, E in FIG. 17 represents information already stored by another user after the original moving picture information has been generated.

Figure 18:
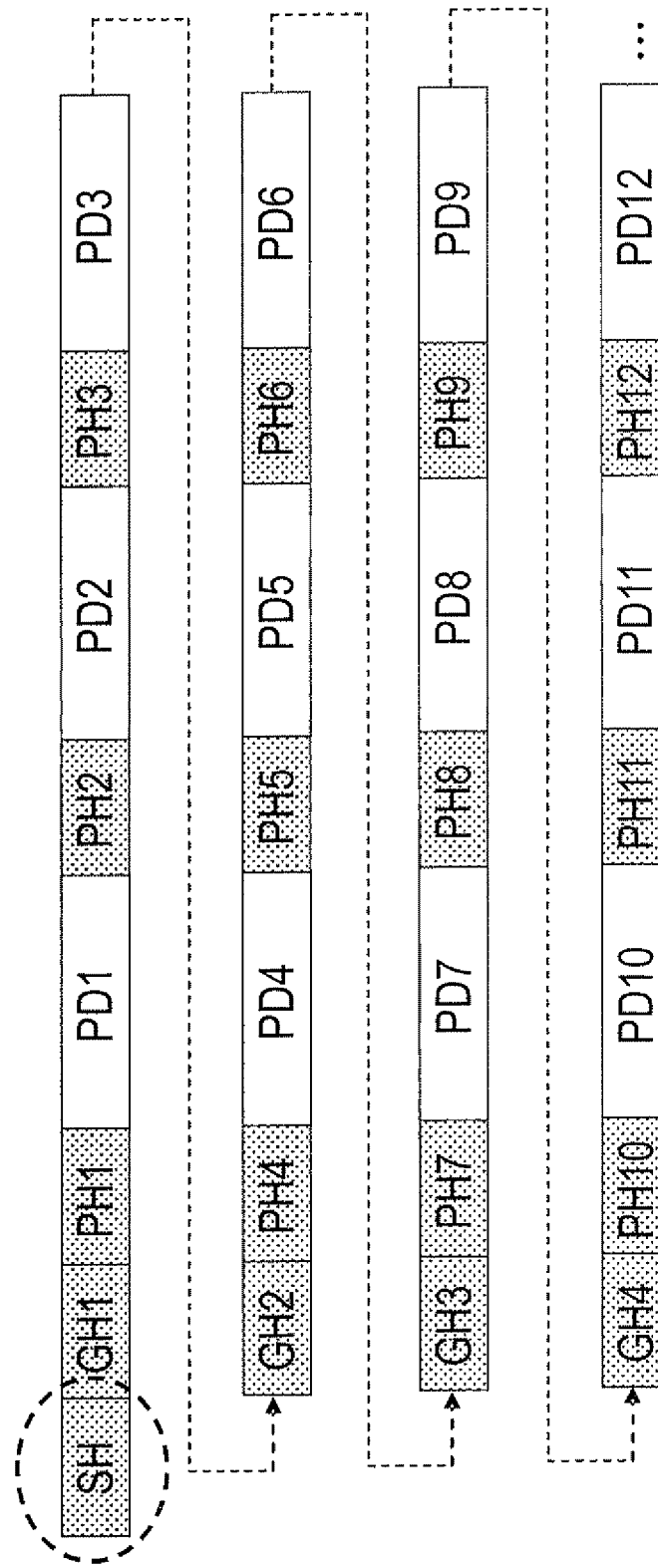
FIG. 18 shows an example of frame configuration where no sequence header is added in an embodiment.

More specifically, first the original moving picture information is split into partial information (GOPs), and the hash information of each GOP is calculated. Since the PIAT signature information of the original moving picture information is verifying information according to which the verifier confirms that each GOP is part of the original moving picture information and not altered, route hash information contained in the PIAT signature information of the original moving picture information has to be generated in a state in which only stream header information, cleared of user header information, is added to every GOP. For this reason, where the frame configuration is such as shown in FIG. 18 for instance, the cutting position is unknown at the time of signing the original moving picture information, and therefore a GOP to which no stream header information is added assign the content of the nearest stream header information to generate hash information in a form containing the stream header information. If SH is assigned to the GOP then, hash information is generated containing that SH as well. It has to be noted, however, that these assigned SHs are not recorded on the original moving picture information itself, but they are assigned on a storage area (such as a memory) when the hash information is generated. Further, by using a set of these hash information items, the well known technique in encryption system of managing hash information with a binary tree (hereafter referred as the binary tree technique) is applied to prepare one item of route hash information. After that, the signer's digital signature is prepared for the prepared route hash information, and the route hash information and the digital signature are put together to generate the signer's PIAT signature information.

Figure 13:
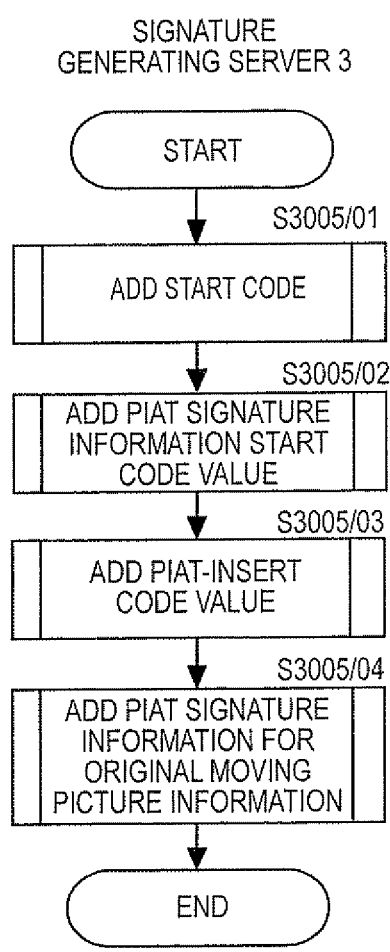
FIG. 13 is another flow chart showing a processing of signature generation in an embodiment.

When the generation of the signer's PIAT signature information is completed in this way, then the PIAT signature information is stored into the SH-U of the original moving picture information (S3005). FIG. 13 is a flow chart of the method of this storing. First, a start code is added to the terminal end of the user header information (S3005/01). Then, PIAT signature information start code value indicating the storage of the signer's PIAT signature information here is added (S3005/02). This added start code value should be unique, different from any other such value, so that it can ensure discrimination from any other user header information (E) already stored. Furthermore, as stated above, if the start code ("0x000001XX") is contained in the PIAT signature information, misconception may invite a sequence error at the time of decoding (reproducing) the original moving picture information. For instance, some kind of start code value indicating a start (such as "B3", "B2" or "B7") should be contained after the start code prefix ("0x000001"), and if a value such as "0x000001FF" for instance emerges within the PIAT signature information, it will invite a sequence error at the time of decoding (reproducing). To avoid such a situation, some measure should be taken to prevent any start code from emerging in the PIAT signature information.

One conceivable example of such preventive measure is to insert and store in the PIAT signature information after its generation non-"0x00" values (such as "0xAA"; hereinafter referred to as PIAT-insert code values) at one-byte intervals to prevent the start code ("0x000001XX") from appearing (S3005/03). This can be accomplished in one of two ways: even if no start code emerges in the PIAT signature information, PIAT-insert code values are automatically inserted, or it is determined in advance whether or not any start code emerges in the PIAT signature information and PIAT-insert code values are inserted as required. In the latter case, however, it is necessary to select some code values indicating the locations of PIAT-insert code values, such as tags, and insert them or to separately manage them in some other way. It is desirable for this storage of PIAT-insert code values to be done, for instance, after the completion of the generation of the PIAT signature information (after the signer's digital signature is affixed). If it is so decided, when the PIAT signature information is taken out for use at the time of signature verification or the like, it is desirable for PIAT-insert code values to be removed beforehand. This will be discussed in further detail in connection with the later description of signature verification processing.

Figure 19:
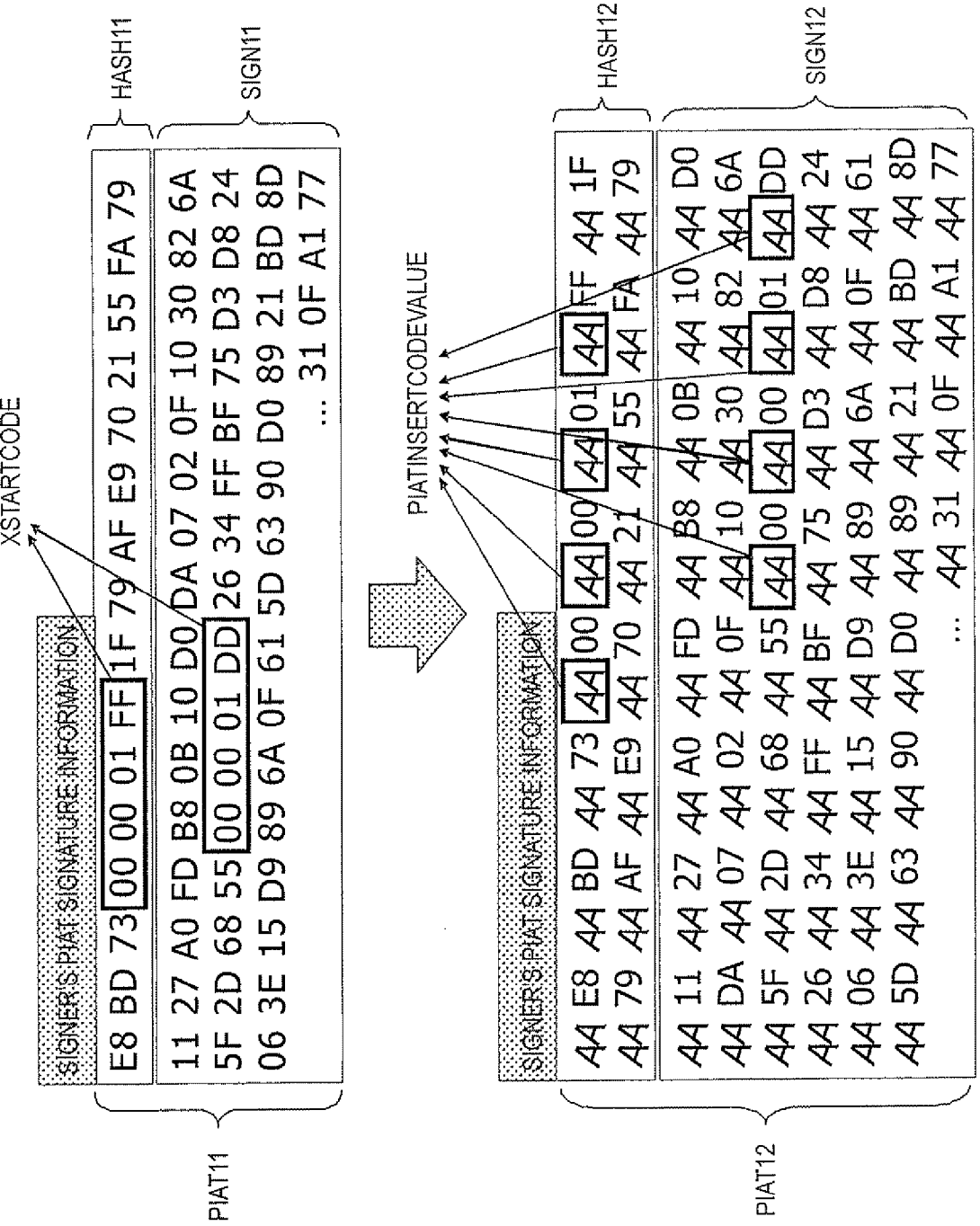
FIG. 19 shows a contents of PIAT signature information on a signer in an embodiment.

FIG. 19 shows the contents of the signer's PIAT signature information to which the former, namely the automatic insertion of PIAT-insert code values, is applied. The upper part (PIAT 11) shows PIAT signature information before the storing of PIAT-insert code values and the lower part (PIAT 12), PIAT signature information after the storing of PIAT-insert code values. In an embodiment, route hash information is recorded as verifying information for the original moving picture information. For the preparation of the route hash information MD5 is used as a cryptographically unidirectional hash function, and recording in a 16 byte capacity is shown here (HASH11). SIGN11 represents the signer's digital signature for verifying information (HASH11). HASH11 and SIGN11 together constitute the signer's PIAT signature information (PIAT11). These HASH11 and SIGN11 have to be tagged to make them distinguishable from each other afterwards.

In the case shown here, start codes (XSTARTCODE) have emerged in both HASH11 and SIGN11, and in the PIAT signature information of the lower part (PIAT12), PIAT-insert code values (PIATINSERTCODEVALUE, "0xAA") for preventing a sequence error at the time of decoding (reproduction) are stored at one byte intervals as shown in HASH12 and SIGN12. PIAT12 serves as the signer's PIAT signature information in which PIAT-insert code values are stored.

Although the verifying information (HASH12) and the signer's digital signature (SIGN12) for the original moving picture information are supposed to be recorded as the PIAT signature information (PIAT12) in an embodiment, it is also conceivable to separately record and manage the verifying information and the signer's digital signature for the original moving picture information. In this case, however, it is necessary to make possible later confirmation of the paired nature of the verifying information and the signer's digital signature for the original moving picture information.

When the addition of PIAT-insert code values at S3005/03 is completed, then the PIAT signature information for the original moving picture information is stored (added) into the user header information (S3005/04).

STOREPIAT1 in FIG. 17 shows how that information is stored. P1H indicates that the signer's PIAT signature information is stored from that point onward. It represents a PIAT signature information start code value, and then P1D represents the substance of the signer's PIAT signature information, both stored as shown in FIG. 17.

Figure 20:
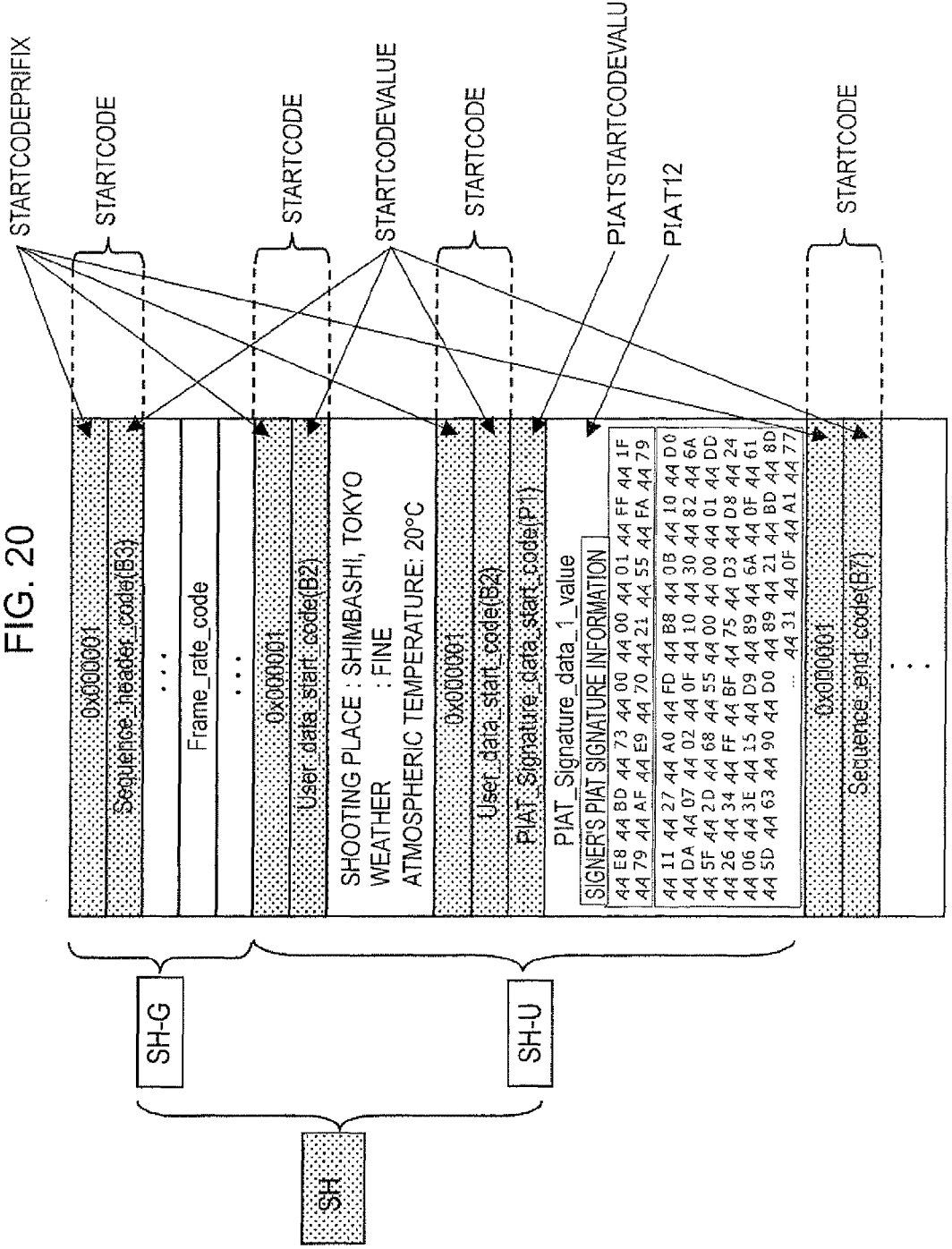
FIG. 20 shows a structure of a sequence header of an original moving picture information after the PIAT signature information is stored in an embodiment.

FIG. 20 shows a structure of SH in a state in which the PIAT signature information of the original moving picture information is stored. It is shown here how from the state of FIG. 11 a start code for storing the PIAT signature information indicating the user header information is added, followed by the addition of a PIAT signature information start code value (PIATSTARTCODEVALUE) indicating the storage of the PIAT signature information of the original moving picture information from a point onward, and finally the substance of the PIAT signature information (PIAT12) of the original moving picture information, which PIAT-insert code values are stored, is added.

Figure 21:
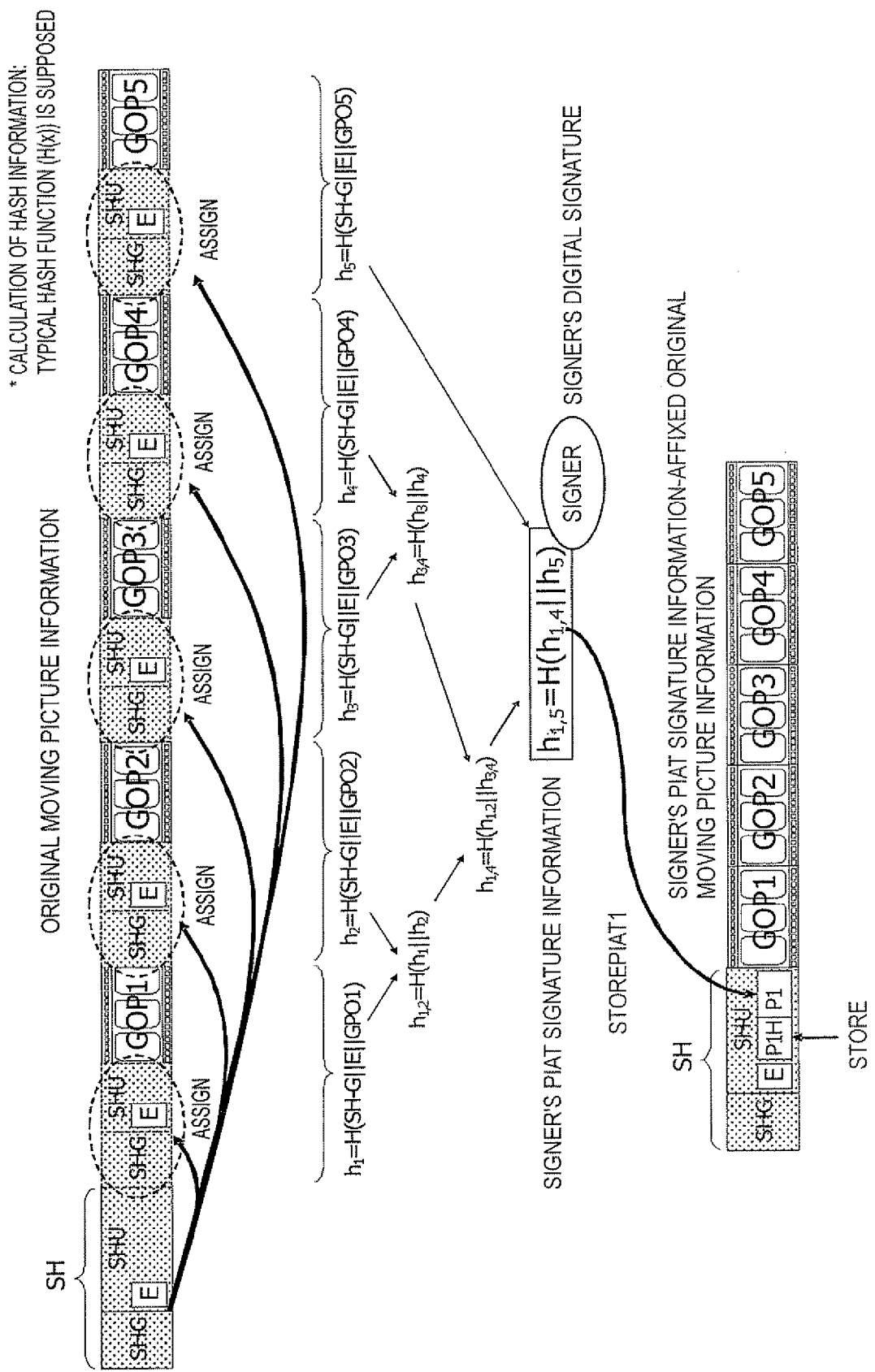
FIG. 21 shows a method of generating signature for original moving picture information in a modified version of an embodiment.

Although FIG. 17 shows a case in which the user header information is not to be covered by the originality warrant but the stream header information (SH-G) is, the same applies to the processing of cases in the originality warrant also covers the user header information. FIG. 21 shows how such processing is done.

When the generation of the PIAT signature information of the original moving picture information and its storage into SH is completed, the signer's PIAT signature information-affixed original moving picture information is accumulated in the document managing DB 31 via the document managing TB 32 in the signature generating server 3 (S3006 in FIG. 12). Then, the signature generating server 3 transmits the signer's PIAT signature information-affixed original moving picture information to the information abstraction server 5 via the communication device 34 (S3007). The information abstraction server 5 receives the signer's PIAT signature information-affixed original moving picture information via the communication device 55 (S3008), and accumulates the signer's PIAT signature information-affixed original moving picture information in the document managing DB 51 via the document managing TB 52 within the information abstraction server 5 (S3009).

Next, the extractor is notified of the completion of the preparation of original moving picture information from the signer by some means of communication or another, and starts cutting out the original moving picture information. This action is taken by extracting only the required part when, for instance, when disclosure of the original moving picture information to a third party is requested. More specifically, in a situation where the original moving picture information partly contains private information, the extraction may be required when part of the original moving picture information is to be cut out.

Figure 14:
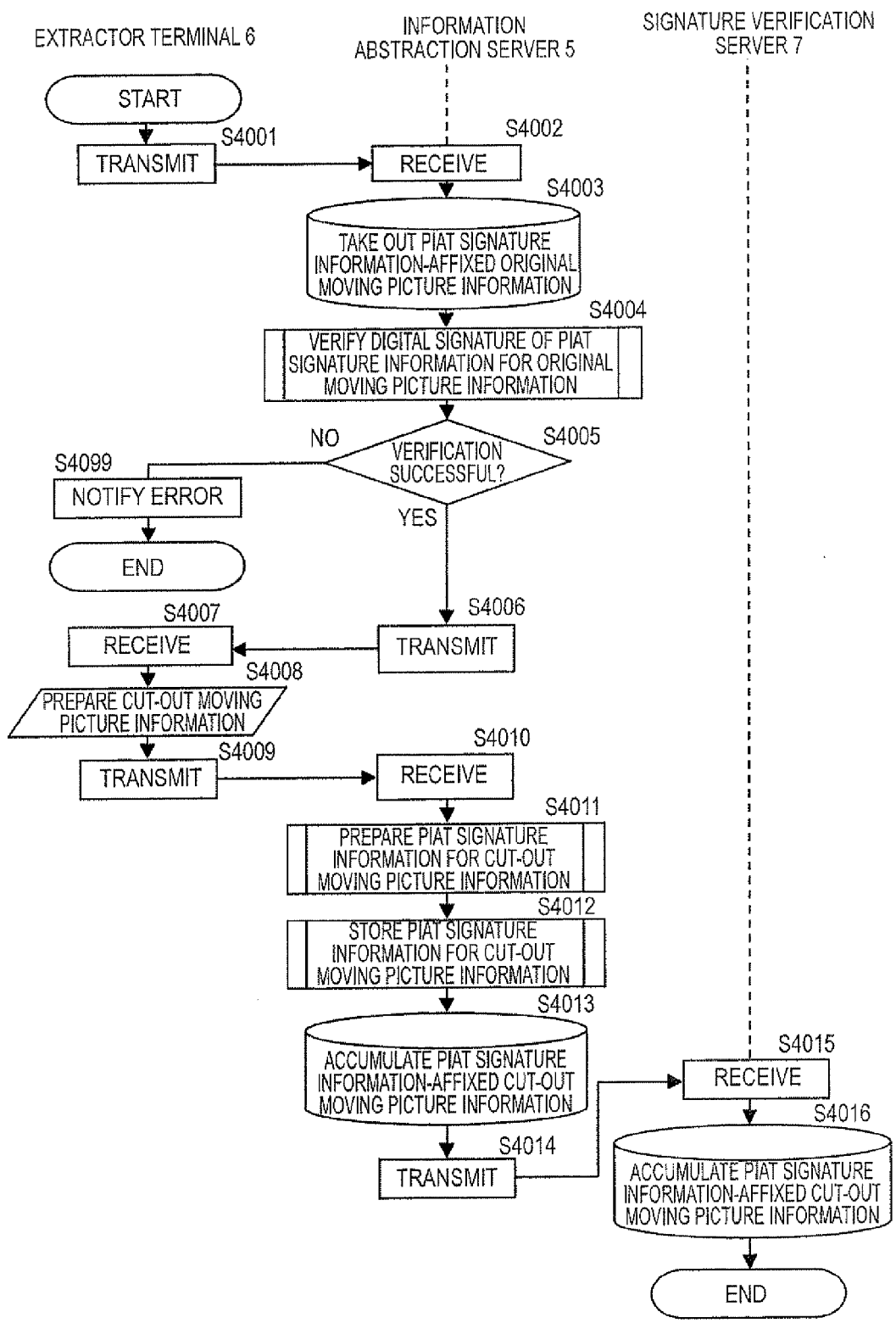
FIG. 14 is a flow chart showing a processing of information abstraction in an embodiment.

As shown in FIG. 14, the extractor, using the extractor terminal 6, transmits to the information abstraction server 5 an instruction to take out the original moving picture information from which the cutting is to be done (S4001). The information abstraction server 5 receives the instruction to take out the original moving picture information from which the cutting is to be done (S4002). The extractor takes out via the document managing TB 52 within the information abstraction server 5 the signer's PIAT signature information-affixed to original moving picture information to be cut out accumulated in the document managing DB 51 (S4003), and verifies via the signature verifying unit 54 the digital signature affixed to the PIAT signature information stored in the user header information of the original moving picture information (S4004). To access the signer's PIAT signature information, as stated above, the start code (STARTCODE) shown in FIG. 20 is detected, and a PIAT signature information start code value (PIATSTARTCODEVALUE) recorded in the area next to that of STARTCODE is checked. If this checkup results in confirmation of the storage of the signer's PIAT signature information, the substance (PIAT12) of any PIAT signature information stored from that area onward can be accessed. The terminal end of the PIAT signature information is until the next start code, namely until immediately before the emergence of a start code ("0x000001B7") indicating the terminal end of SH in an embodiment.

When the signer's PIAT signature information has been successfully taken out (PIAT12 in FIG. 19), then processing to remove PIAT-insert code values is performed. In this embodiment, both HASH12 and SIGN12 PIAT-insert code values ("0xAA") are stored at one byte intervals. For this reason, at the time of digital signature verification, the verification should be processed by using information cleared of the PIAT-insert code values. If the digital signature verification attempt fails (S4005: NO), some alteration (error) is assumed to have occurred and the extractor is notified of that assumption (S4099). If the digital signature verification is successfully accomplished (S4005: YES), the original moving picture information is transmitted to the extractor terminal 6 (S4006). When the original moving picture information is received by the extractor terminal 6 (S4007), the original moving picture information is displayed on a display device provided on the extractor terminal 6. Then, the extractor extracts a necessary part from the original moving picture information and prepares cut-out moving picture information (S4008).

Figure 22:
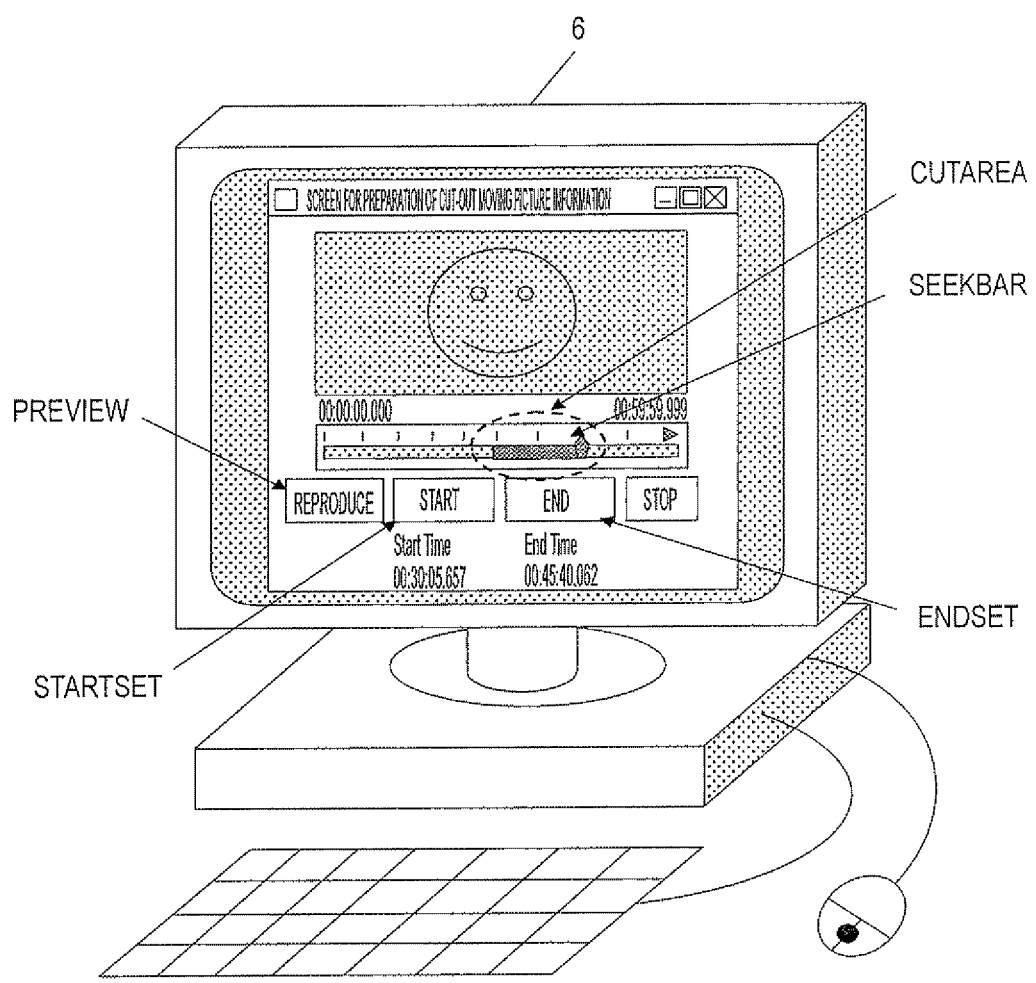
FIG. 22 shows an operation to extract original moving picture information in an embodiment.

FIG. 22 shows one example of the extractor's operation to extract original moving picture information. The extractor can cut out (obtain) desired information by direct vision by designating the area needed to be cut out while reproducing cut-out moving picture information with a reproduction button (PREVIEW). The cutting method may be such that first a seek bar (SEEKBAR) is used, and a start button (STARTSET) is pressed down in any desired position to set the starting position of cutting; then the seek bar (SEEKBAR) is used again, and an end button (ENDSET) is pressed down in any desired position to set the ending position of cutting. As the cutting area (CUTAREA) is determined by this operation, the cut-out moving picture information generation menu is selected to prepare the cut-out moving picture information.

In the example of MPEG1 frame configuration shown in FIG. 10, SH is added to the leading edge of every GOP, but SH does not necessarily have be added to every GOP; therefore as viewed on a GOP-by-GOP basis, there also can be a frame configuration in which SH is added to the leading GOP (GH1) but not to any subsequent GOP.

Where a GOP begins with an SH, the start of the GOP can be recognized by detecting the SH. Further, even where no SH is added to a GOP, which instead begins with a GH, the start of the GOP can be recognized by detecting the GH. However, considering the possibility of partial cutting out to protect privacy, some problem remains with application to MPEG1 having the frame configuration of FIG. 18. Thus, in the case of the frame configuration of FIG. 18, if cutting is done at GH2, GH3 or GH4, the cut moving picture may prove impossible to reproduce. This is due to the rule under the MPEG1 standards that the leading GOP (GH1) of streaming data should always have SH to ensure reproduction.

To prevent the cut-out moving picture from proving impossible to reproduce, the following measure is taken.

Figure 23:
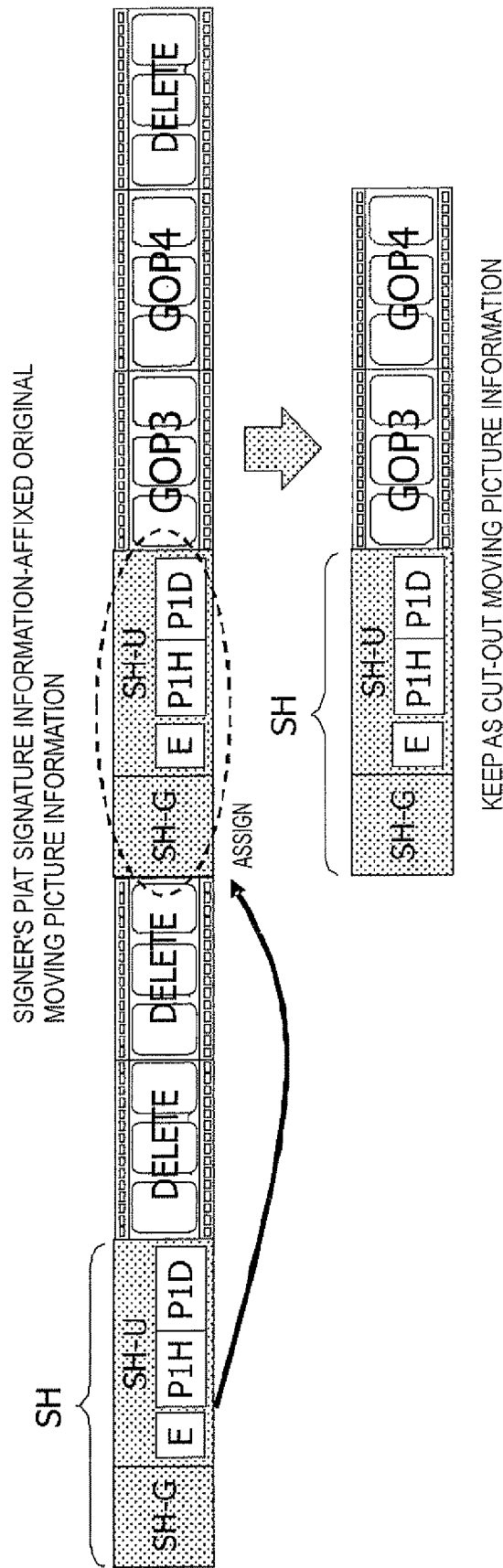
FIG. 23 shows a method of generating cut-out moving picture information in an embodiment.

First as shown in FIG. 23, the content of the nearest SH is assigned to any GOP having no SH, and cut-out moving picture information is generated in a form containing SH as well. The SH content then is assigned including the whole information stored (other users information (E) and the signer's PIAT signature information) in the user header information of the original moving picture information, and inherited as the SH information of the cut-out moving picture information. The assigned SH avoids impossibility of reproduction by being added to the substance of the cut-out moving picture information. Whereas FIG. 23 also shows a case in which data parts have been cut from GOP3 to GOP4, cut-out moving picture information can be reproduced if SH is added to the leading GOP. Therefore, SH is not necessarily required to be added to GOP4, so that the data quantity of the cut-out moving picture information can be saved.

Figure 24:
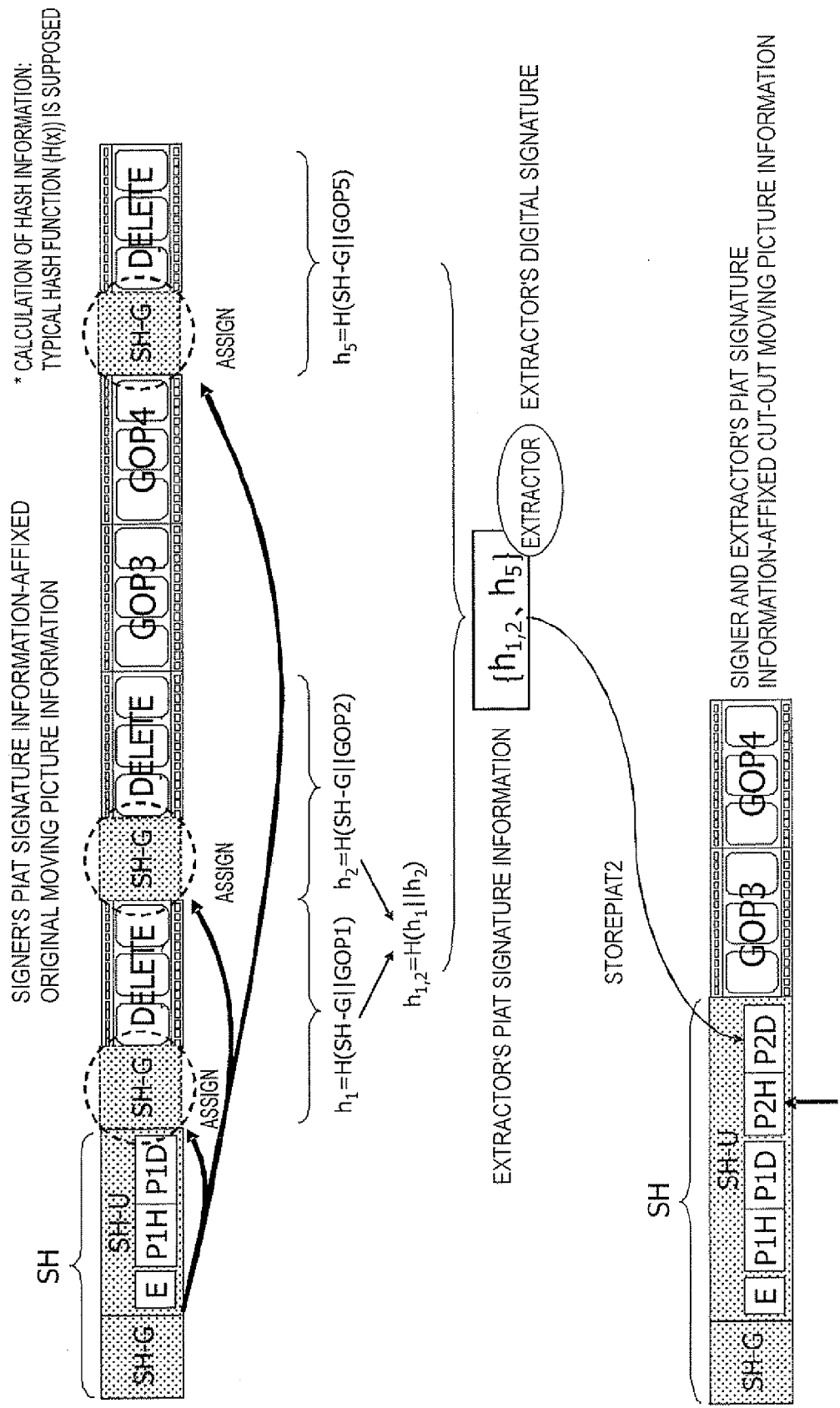
FIG. 24 shows a method of generating signature for cut-out moving picture information in an embodiment.

When the preparation of the cut-out moving picture information is completed as shown in FIG. 14, the prepared cut-out moving picture information is transmitted to the information abstraction server 5 (S4009). Having received the cut-out moving picture information (S4010), the signature generating unit 53 in the information abstraction server S generates PIAT signature information for the cut-out moving picture information. FIG. 24 shows how it is generated. When generating PIAT signature information for cut-out moving picture information, as in generating PIAT signature information for the original moving picture information, the method of generating PIAT signature information differs with the determination of whether or not to have the user header information in SH (SH-U) covered by the originality warrant when the PIAT signature information of the original moving picture information was generated. This generating method is determined by what kind of originality warrant the PIAT signature information of the original moving picture information was subjected to when it was generated. FIG. 24 shows a case in which the user header information was not covered by the originality warrant but the stream header information (SH-G) was.

More specifically, a plurality of units of route hash information GOPs comprising only those to be deleted by extraction (hereafter referred to as a list of deleted route hash information) are prepared. Then, as in generating the PIAT signature information for the original moving picture information, the content of the nearest SH is assigned to any GOP having no SH in the deleted portion, and the list of deleted route hash information is generated in a form containing SH as well. Further, the extractor's digital signature is prepared for the list of deleted route hash information that has been prepared, and the list of deleted route hash information and the digital signature together are used as the extractor's PIAT signature information (S4011) in FIG. 14. When the generation of the extractor's PIAT signature information is completed, then the PIAT signature information is stored into SH-U of the cut-out moving picture information (S4012).

Figure 15:
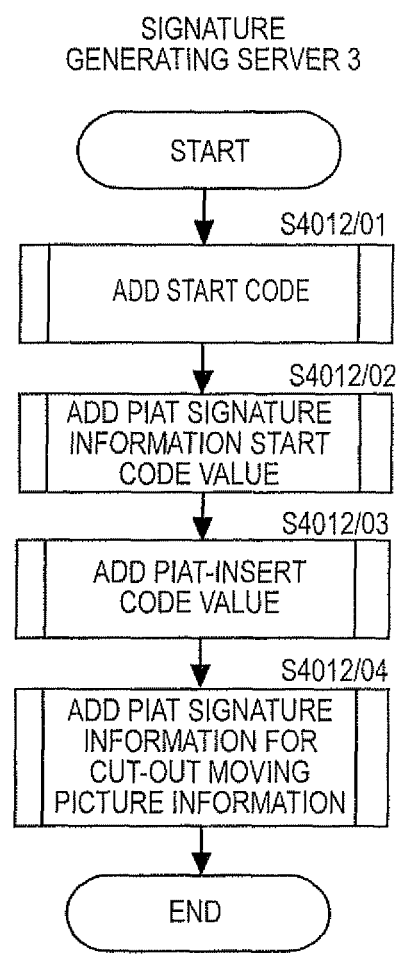
FIG. 15 is another flow chart showing a processing of information abstraction in an embodiment.

FIG. 15 is a flow chart showing that storage method. First, a start code is added to the terminal end of the user header information (S4012/01). Then, a PIAT signature information start code value indicating that the extractor's PIAT signature information is stored from there onward is added (S4012/02). This added start code value should be unique, different from any other such value, so that it can ensure discrimination from any other user header information (E) or signer's PIAT signature information already stored. Furthermore, as stated above, if the start code ("0x000001XX") is contained in the PIAT signature information, misconception may invite a sequence error at the time of decoding (reproducing) the original moving picture information. For instance, some kind of start code value indicating a start (such as "B3", "B2" or "B7") should be contained after the start code prefix ("0x000001"), and if a value such as "0x000001FF" emerges within the PIAT signature information, it will invite a sequence error at the time of decoding (reproducing). To avoid such a situation, some measure should be taken to prevent any start code from emerging in the PIAT signature information. One conceivable example of such preventive measure is to insert and store a PIAT-insert code values ("0xAA") as described above (S4012/03). It is desirable for this storage of PIAT-insert code value to be done, for instance, after the completion of the generation of the PIAT signature information (after the signer's digital signature is affixed).

Figure 25:
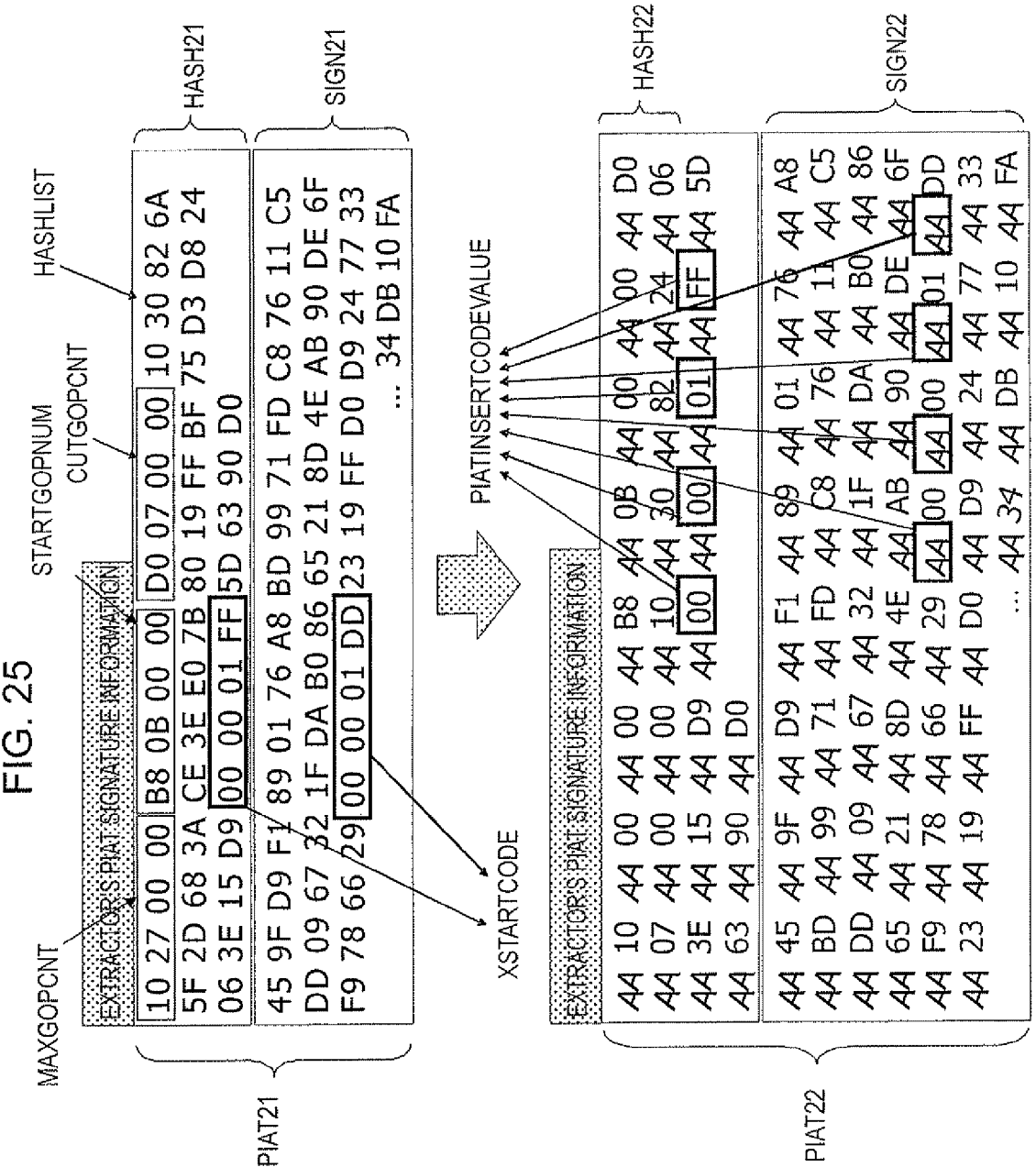
FIG. 25 shows a contents of PIAT signature information on an extractor in an embodiment.

FIG. 25 shows the contents of the extractor's PIAT signature information. The upper part (PIAT 21) shows PIAT signature information before the storing of PIAT-insert code values and the lower part (PIAT 22) shows PIAT signature information after the storing of PIAT-insert code values. In an embodiment, first a total number of GOPs (MAXGOPCNT) of the underlying original moving picture information, then the GOP number (STARTGOPNUM) of the cutting start position, a number of cut-out GOPs (CUTGOPCNT) and finally a list of deleted route hash information (HASHLIST) are successively recorded as the verifying information for the original moving picture information (HASH21). SIGN21 represents the extractor's digital signature for these items of verifying information. HASH21 and SIGN21 together constitute the extractor's PIAT signature information (PIAT21). These HASH21 and SIGN21 have to be tagged to make them distinguishable from each other afterwards.

In the case shown here, start codes (XSTARTCODE) have emerged in both HASH21 and SIGN21, and in the PIAT signature information of the lower part (PIAT22), PIAT-insert code values (PIATINSERTCODEVALUE, "0xAA") for preventing a sequence error at the time of decoding (reproduction) are stored at one byte intervals as shown in HASH22 and SIGN22. PIAT22 serves as the extractor's PIAT signature information in which PIAT-insert code values are stored.

Although the verifying information (HASH22) and the extractor's digital signature (SIGN22) for the cut-out moving picture information are supposed to be integrally recorded as the PIAT signature information (PIAT22) in this embodiment, it is also conceivable to separately record and manage the verifying information and the extractor's digital signature for the cut-out moving picture information. In this case, however, it is necessary to make possible later confirmation of the paired nature of the verifying information and the extractor's digital signature for the cut-out moving picture information.

When the addition of PIAT-insert code values at S4012/03 is completed in FIG. 15, then the PIAT signature information for the cut-out moving picture information is stored, for example, into the user header information (S4012/04).

STOREPIAT2 in FIG. 24 shows how that information is stored. P2H indicates that the extractor's PIAT signature information is stored from here onward. It represents a PIAT signature information start code value, and then P2D represents the substance of the extractor's PIAT signature information, both stored as shown in FIG. 24. This is additionally stored, leaving the earlier stored other user information (E) and the signer's PIAT signature information intact, and version number management is accomplished.

Figure 26:
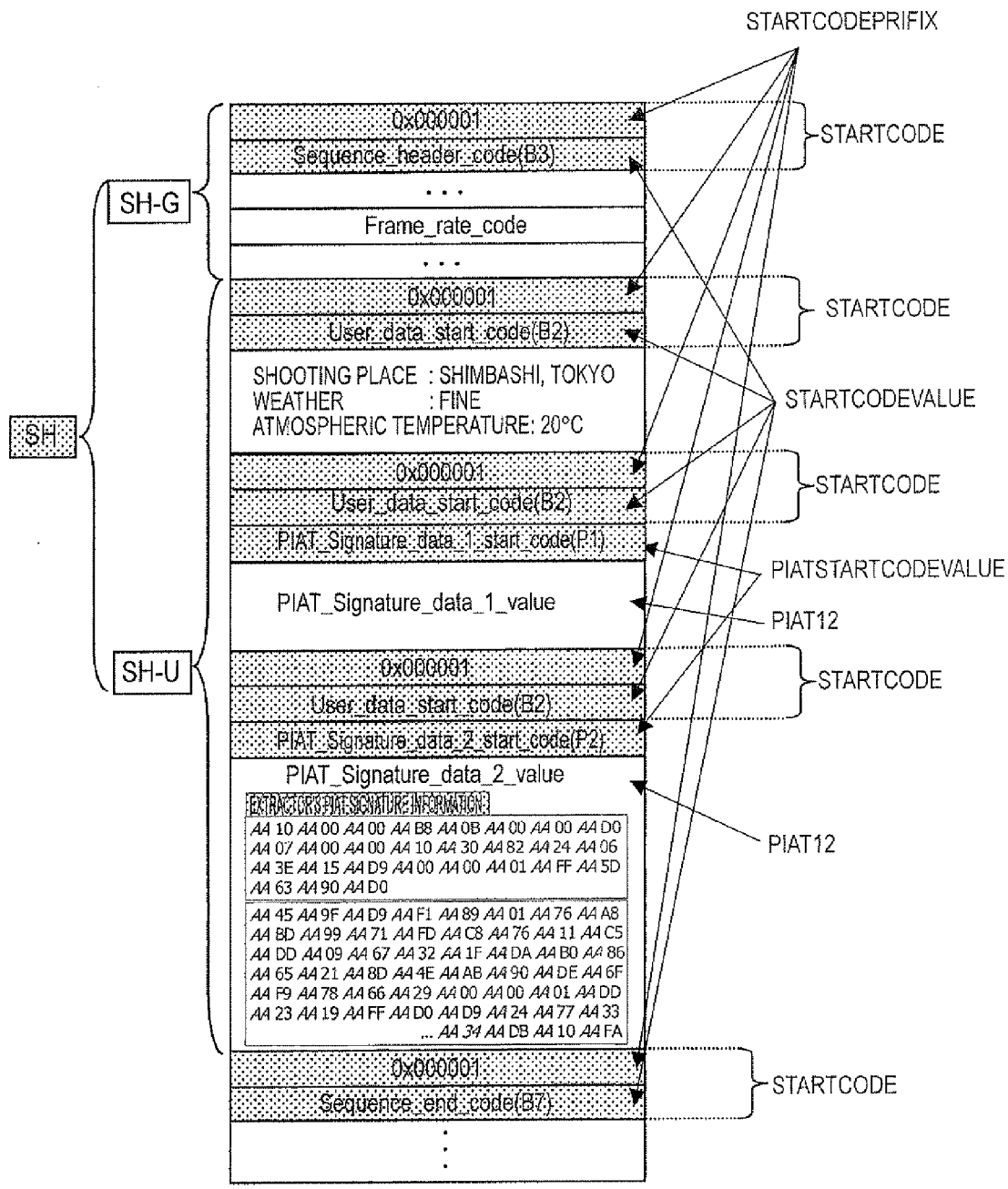
FIG. 26 shows a structure of a sequence header of cut-out moving picture information after the PIAT signature information is stored in an embodiment.

FIG. 26 shows a structure of SH in a state in which the PIAT signature information of the cut-out moving picture information is stored. It is shown here how, from the state of FIG. 20 in which the PIAT signature information for the original moving picture information is stored, a start code for storing the PIAT signature information indicating the user header information is added, indication of the user header information is added, followed by addition of a PIAT signature information start code value (PIATSTARTCODEVALUE) indicating the storage of the PIAT signature information of the cut-out moving picture information from here onward, and finally the substance of the PIAT signature information (PIAT22) of the cut-out moving picture information, in which PIAT-insert code values are stored, is added.

Figure 27:
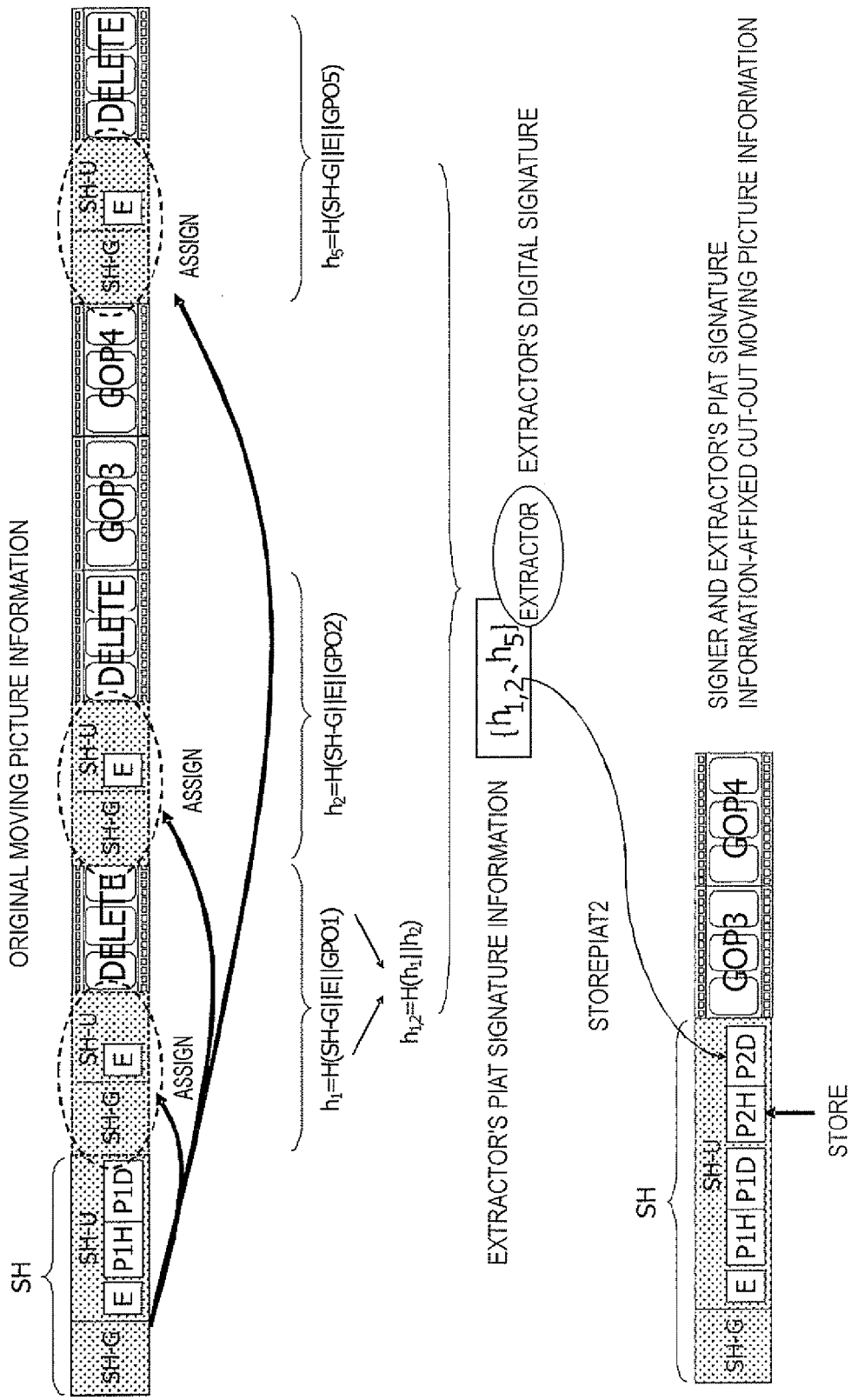
FIG. 27 shows a method of generating signature for cut-out moving picture information in a modified version of an embodiment.

Although FIG. 24 shows a case in which the user header information is not to be covered by the originality warrant but the stream header information (SH-G), the same applies to the processing of cases in the originality warrant covers the user header information. FIG. 27 shows how such processing is done.

Further, as another embodiment of the invention, there can be a form in which, before storing the PIAT signature information for the cut-out moving picture information from the state shown in FIG. 20 in which the PIAT signature information of the original moving picture information is stored, another user information (E2) is newly prepared and, for instance, the actual day, hours and other information on the time when the data were cut out are stored. This E2, similar to the PIAT signature information of the cut-out moving picture information, can conceivably be stored as information appended to the cut-out moving picture information. This presupposes that correct addition of a start code precedes the storing.

When the generation of the PIAT signature information of the cut-out moving picture information is completed, the signer and extractor's PIAT signature information-affixed cut-out moving picture information is accumulated in the document managing DB 51 via the document managing TB 52 of the information abstraction server 5 (S4013) as shown in FIG. 14. Then, the information abstraction server 5 transmits the signer and extractor's PIAT signature information-affixed cut-out moving picture information to the signature verification server 7 via the communication device 55 (S4014). The signature verification server 7 receives the signer and extractor's PIAT signature information-affixed cut-out moving picture information via the communication device 74 (S4015), and accumulates the signer and extractor's PIAT signature information-affixed cut-out moving picture information in the document managing DB 71 via the document managing TB 72 in the signature verification server 7 (S4016).

Figure 16:
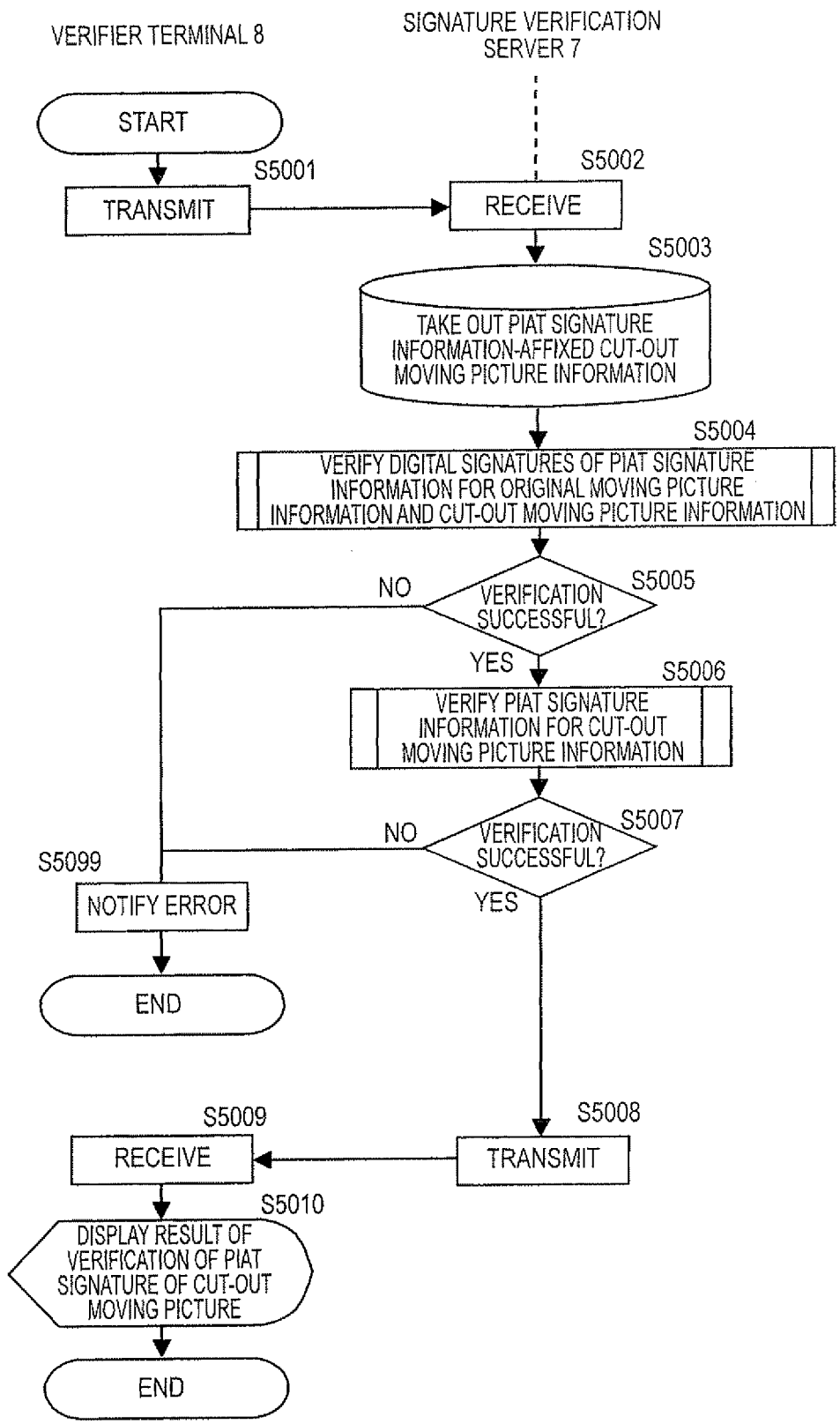
FIG. 16 is a flow chart showing a processing of signature verification in an embodiment.

Next, as shown in FIG. 16, the verifier is notified of the disclosure of the cut-out moving picture information from the extractor by some means of communication or another, and starts checking and verification of the disclosed cut-out moving picture information.

Figure 28:
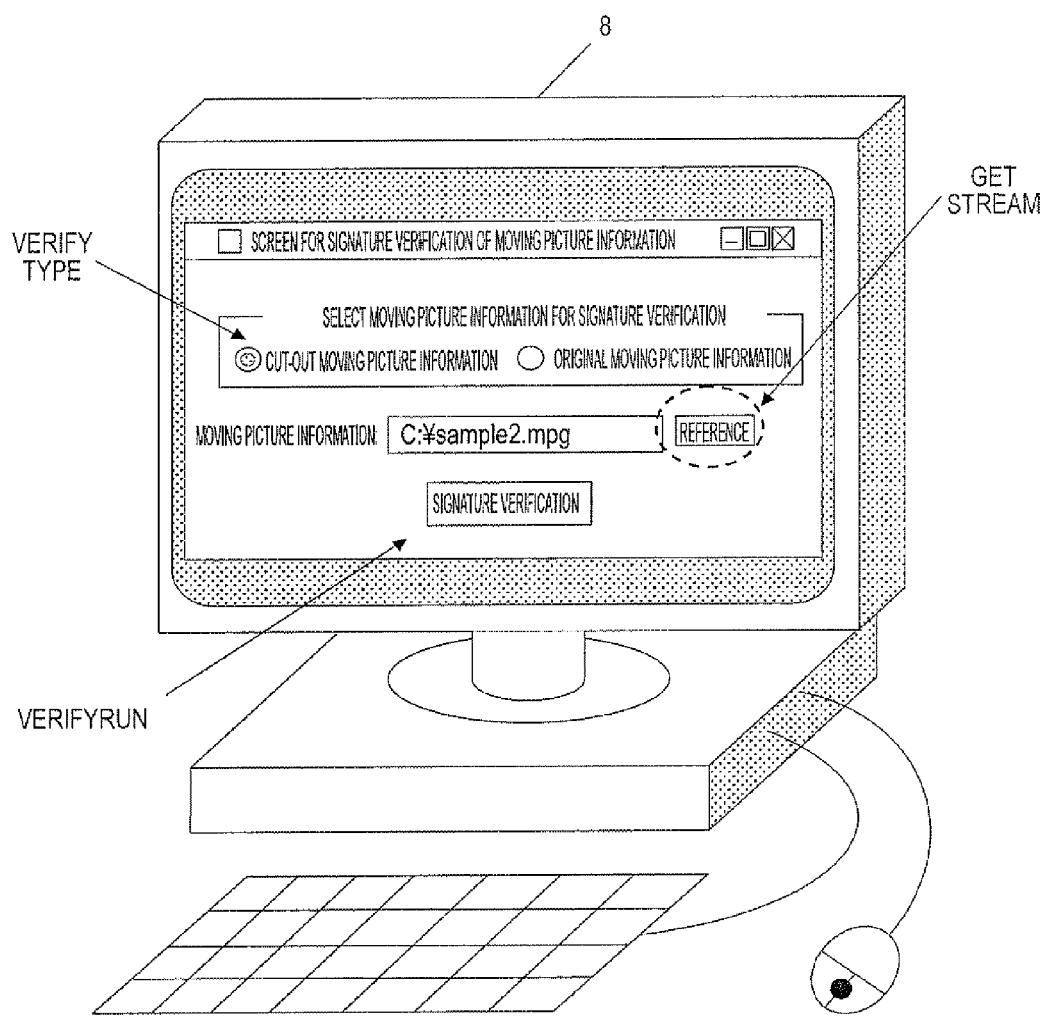
FIG. 28 shows a screen for selecting moving picture information of an object of verification in an embodiment.

The verifier transmits to take out the cut-out moving picture information to be verified to the signature verification server 7 by using the verifier terminal 8 (S5001). FIG. 28 shows one example of moving picture information to be verified. This embodiment allows choice (selection) between cut-out moving picture information and original moving picture information at the time of signature verification, and verification of each type of moving picture information (VERIFY-TYPE). If, for instance, cut-out moving picture information is chosen, it is made possible to choose cut-out moving picture information, which can be chosen by pressing down a reference button (GETSTREAM). Also by pressing down the reference button, cut-out moving picture information accumulated in the document managing DB 71 of the signature verification server 7 can be referenced and selected. Finally, by pressing down a signature verification button (VERIFYRUN), the selected cut-out moving picture information is subjected to signature verification processing. In this way, the verifier only has to select the verifying information cut-out moving picture information and accomplish verification easily without having to be conscious of the presence of each unit of PIAT signature information. There can also be another method by which a title which allows ready presumption and identification of the content of each unit of cut-out moving picture information is assigned, and a list of such titles is shown to the verifier for selection out of this list. In this case, it is necessary to keep, for instance, link information to make possible, when a unit of moving picture information is selected from the list, identification of the selected moving picture information among the units of moving picture information accumulated in the document managing DB 71 in the signature verification server 7.

When the processing for signature verification is executed, the signature verification server 7 receives the instruction to take out the cut-out moving picture information to be verified (S5002). The signer and extractor's PIAT signature information-affixed cut-out moving picture information accumulated in the document managing DB 71 is taken out via the document managing TB 72 in the signature verification server 7 (S5003), and the digital signature added to the PIAT signature information is checked via the signature verifying unit 73 (S5004). That is, the digital signatures of PIAT signature information for original moving picture information and cut-out moving picture information is verified. To access the signer's PIAT signature information and the extractor's PIAT signature information here, as stated above, the start code (STARTCODE) shown in FIG. 26 is detected, and a PIAT signature information start code value (PIATSTARTCODEVALUE) recorded in the area next to that of STARTCODE is checked. If this checkup results in confirmation of the storage of the signer's PIAT signature information and the extractor's PIAT signature information, the substances (PIAT12 and PIAT22) of any PIAT signature information stored from that area onward can be accessed. The terminal end of the signer's PIAT signature information is until immediately before the emergence of the next start code ("0x000001B2"), and the terminal end of the extractor's PIAT signature information is until immediately before the emergence of the next start code, namely immediately before the emergence of the start code ("0x000001B7") indicating the terminal end of SH in this embodiment.

Figure 29:
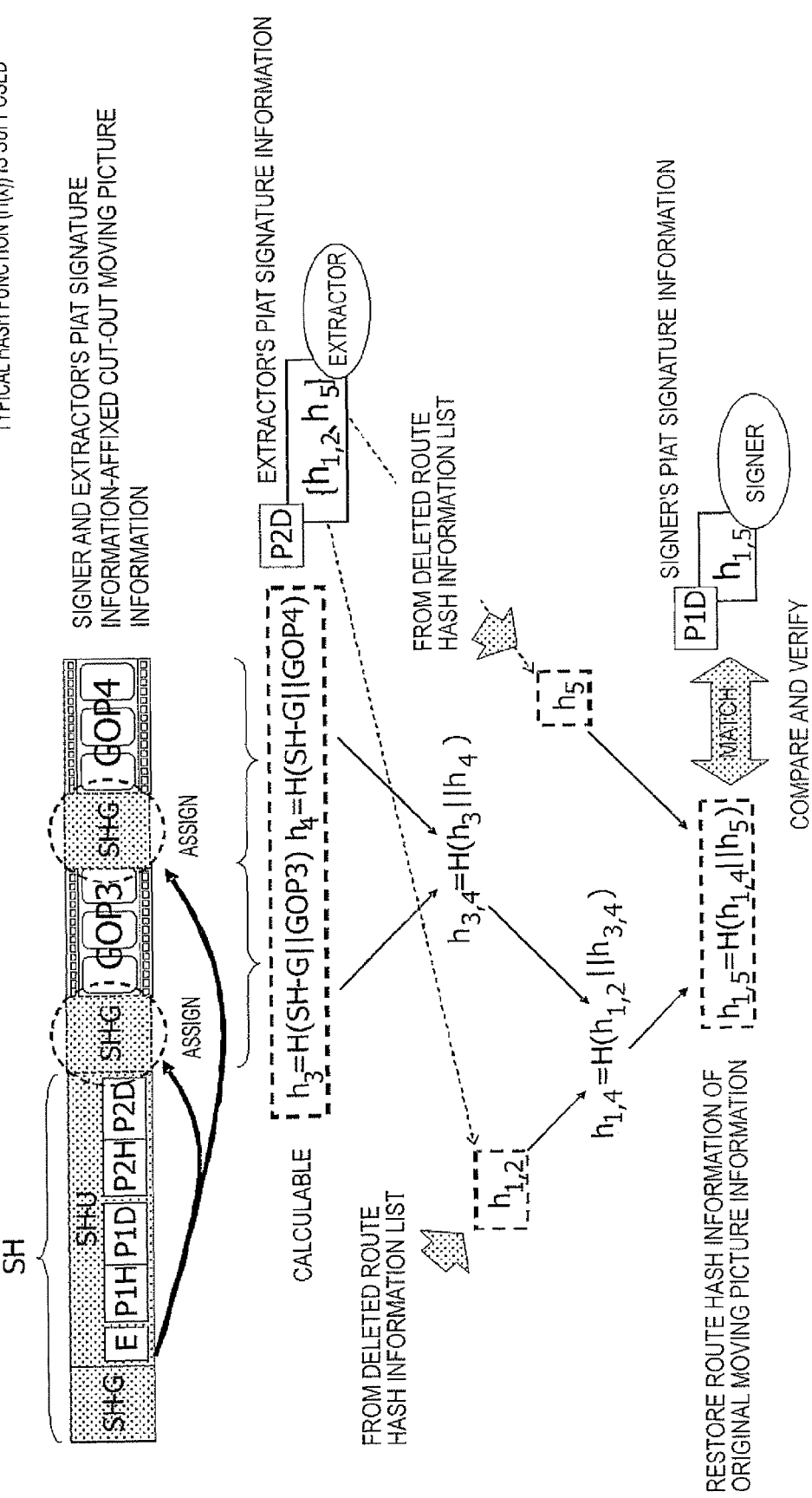
FIG. 29 shows a method of signature verification for cut-out moving picture information in an embodiment.

When the signer's PIAT signature information and the extractor's PIAT signature information have been successfully taken out (PIAT12 in FIG. 19 and PIAT22 in FIG. 25), then other elements than PIAT-insert code values are processed. In an embodiment, HASH12, SIGN12, HASH22 and SIGN22 all store PIAT-insert code values ("0xAA") at one byte intervals. For this reason, digital signature verification has to be processed by using information cleared of the PIAT-insert code values. If the digital signature verifying attempt fails (S5005, NO), some alteration (error) is assumed to have occurred and the verifier is notified of that assumption (S5099). If the digital signature verification is successfully accomplished (S5005: YES), an attempt to verify the PIAT signature information for the cut-out moving picture information follows (S5006). FIG. 29 shows how this attempt is made. When verification of the PIAT signature information for the cut-out moving picture information is attempted, the verification method for the PIAT signature information differs with the determination of whether or not to have the user header information in SH (SH-U) covered by the originality warrant when the original moving picture information and the PIAT signature information of the cut-out moving picture information were generated.

This verification method is determined by what kind of originality warrant the PIAT signature information of the original moving picture information was subjected to when it was generated. FIG. 29 shows a case in which the user header information was not covered by the originality warrant but the stream header information (SH-G) was. If in this case two consecutive data parts GOP3 to GOP4 are being cut as shown in FIG. 23, and hash information is generated in a state in which GOP4 contains no SH because GOP4 requires no SH, verification of the PIAT signature information for the cut-out moving picture information will fail. Therefore, the content of the nearest SH is assigned to any GOP having no SH in attempting verification of the PIAT signature information for the cut-out moving picture information as well, and hash information is generated in a form containing SH. Only SH-G is assigned but none of other items stored in SH-U, such as other user information (E), the signer's PIAT signature information and the extractor's PIAT signature information, is assigned. It has to be noted, however, that this SH-G assigned is not recorded in the substance of the cut-out moving picture information, but what is meant here is strictly that it is merely assigned on a storage area (such as a memory), for instance, when the hash information is generated.

Figure 30:
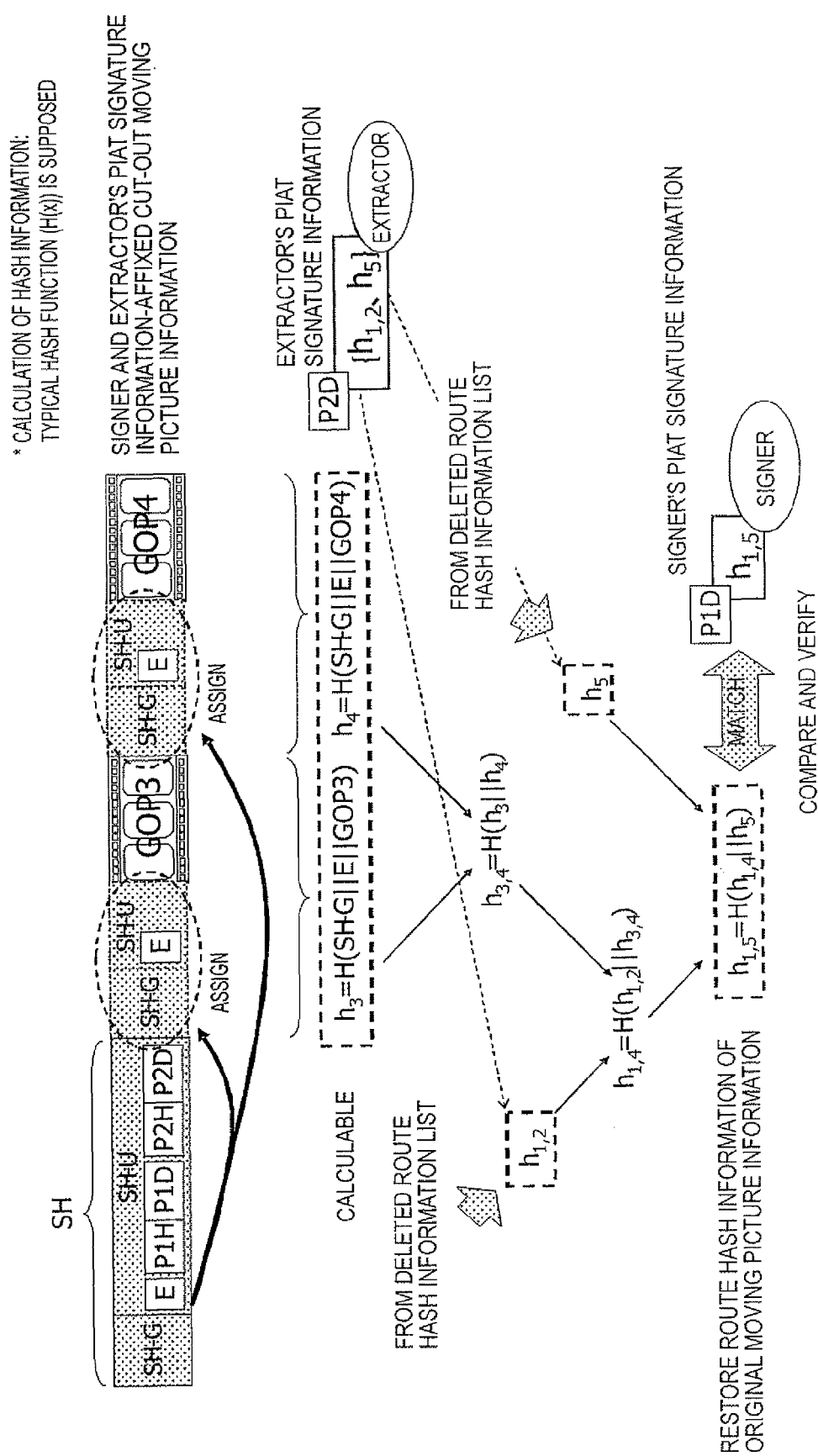
FIG. 30 shows a method of signature verification for cut-out moving picture information in a modified version of an embodiment.

Then, together with the list of deleted route hash information contained in the extractor's PIAT signature information, the route hash information of the original moving picture information are restored, and checked in comparison with the signer's PIAT signature information. Further, though FIG. 29 shows a case in which the user header information is not covered by the originality warrant but the stream header information (SH-G) is, processing is done in the same way when the object of the originality warrant covers the user header information as well. FIG. 30 shows how this processing is done. In this case, neither of the signer's PIAT signature information nor the extractor's PIAT signature information stored in SH-U is assigned.

Figure 31:
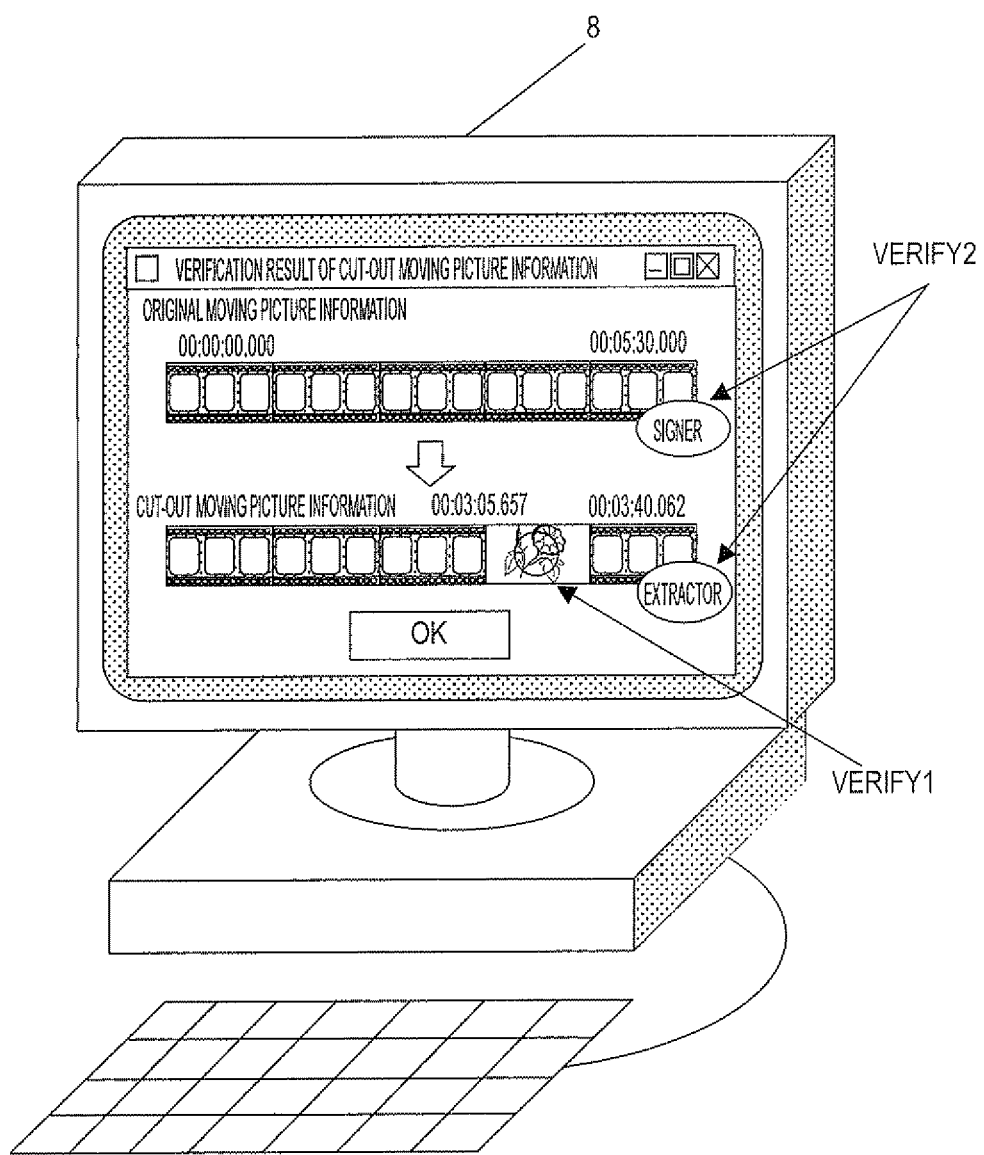
FIG. 31 shows the result of signature verification of cut-out moving picture information in an embodiment.

If the PIAT signature information verification fails (S5007: NO) in FIG. 16, some alteration (error) is assumed to have occurred and the verifier is notified of that assumption (s5099). If the PIAT signature information verification is successfully accomplished (S5007. YES), the result of verification of PIAT signature information of the cut-out moving picture information is transmitted to the verifier terminal 8 (S5008). When the result of verification of the PIAT signature information of the cut-out moving picture information is received by the verifier terminal 8 (S5009), that result is displayed on a display device provided at the verifier terminal 8 (S5010). FIG. 31 shows one example of result of signature verification displayed on the display device provided at the verifier terminal 8. By referencing this result of verification, the verifier can confirm not only that it is part of the original moving picture information but also the originality of the cut-out moving picture information (VERIFY1) because the cut-out range, namely what part of the original moving picture information has been cut out, and the non-alteration of that part is expressly displayed.

Further, it is possible to confirm who prepared the original moving picture information and who cut the data part out of it (by whom the cut-out moving picture information was prepared) by checking the signer and extractor's digital signature (VERIFY2).

The original moving picture information can also be subjected to verification. For instance, choice can be made by selecting original moving picture information in VERIFY-TYPE in FIG. 28 and pressing down the reference button (GETSTREAM in FIG. 28). Further, by pressing down the reference button, original moving picture information accumulated in the document managing DB 71 in the signature verification server 7 can be reference and selected. Finally, by pressing down the signature verification button (VERI-FYRUN in FIG. 28), the selected original moving picture information can be subjected to signature verification processing.

Although an embodiment has been described with reference to a form in which a binary tree technique is applied with a view to reducing the data quantity of PIAT signature information, the method of managing hash information with a binary tree need not be used if the document managing DB of each server has a large enough capacity, and instead hash information may be generated and recording in the units of GOP contained in the original moving picture information.

In this way, the effectiveness of PIAT signature information for moving picture information can be realized. As a result, according to the invention, even if original moving picture information is cut out only partially to protect privacy or other purposes, the cut-out area (position) can be detected and the originality of the cut-out moving picture information can be checked while avoiding impossibility to reproduce the cut-out moving picture information. Also, as the extractor can be identified from the digital signature affixed to the PIAT signature information, even if the extractor alters in some way or adds something to the cut-out moving picture information, such action can be traced back. Further according to the invention, as PIAT signature information which would serve as verifying information is stored into SH of the cut-out moving picture information for circulation while averting the problem of impossibility of decoding analysis (reproduction), only the moving picture information which is to be verified needs to be designated at the time of signature verification, the need to relate moving picture information to PIAT signature information and to manage them accordingly is eliminated unlike in separate circulation of each PIAT signature information unit from moving picture information, and a correspondingly greater saving in disclosure cost can be expected.

To add, signature management programs according to the invention can be made available by offering a program which causes action(s) (processes) shown in the foregoing flow charts and the operations therefor for the embodiments. These programs can be recorded in computer-readable media and executed by a computer. The computer may include a host device such as a personal computer, the controller of a testing device, or the controller of a storage device, such as an MPU or a CPU. Computer-readable media applicable in this context include portable storage media such as CD-ROMs, flexible disks, DVDs, magneto-optic disks and IC cards, a database holding computer programs, another computer and the database thereof, and transmission media on communication lines.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A non-transitory computer-readable storage medium that stores a program for causing a computer to execute a process including signature management of partial content cut-out of streaming data, the process comprising:
   preparing signature information for streaming data;
   partitioning a sequence header of the streaming data into stream header information needed for reproduction of the streaming data and user header information in which a user can store desired information; and
   storing insert data indicating a start of the signature information of a partial content that is cut-out of the streaming data within said user header information so that a start code is kept out of the signature information, and wherein the partial content cut-out of the streaming data is verified using the signature information of the partial content stored in said user header information.

2. The non-transitory computer-readable storage medium according to claim 1, wherein:

when storing said insert data into said user header information, said insert data is stored under a version management which involves no overwriting of a version number.

3. The non-transitory computer-readable storage medium according to claim 1, the process comprising:

adding a start code value indicating storage of the insert data to a terminal end of said user header information.

4. The non-transitory computer-readable storage medium according to claim 1, wherein:

the insert data including said sequence header having the stream header information and said user header information is generated when said user header information is included in an object of originality verification.

5. The non-transitory computer-readable storage medium according to claim 1, the process comprising:

generating signature-related information including said sequence header cleared of the user header information when said user header information is not included in an object of originality verification.

6. The non-transitory computer-readable storage medium according to claim 1, wherein:

signature-related information into which a desired value is inserted at one byte intervals is stored and inserted values are removed beforehand at a time of signature verification.

7. The non-transitory computer-readable storage medium according to claim 1, the process comprising:

automatically inserting a desired value even when no start code emerges in the insert data.

8. The non-transitory computer-readable storage medium according to claim 6, the process comprising:

determining, in advance, whether a start code emerges in said insert data and inserting a desired value as required.

9. The non-transitory computer-readable storage medium according to claim 1, the process comprising:

splitting original stream data into a plurality of information parts, generating hash information for each information part after adding content of a nearest sequence header when no sequence header is added to the information part, preparing a signer's digital signature for one unit of route hash information obtained from units of hash information, and preparing the signer's signature-related information by combining the route hash information and the signer's digital signature.

10. The non-transitory computer-readable storage medium according to claim 9, wherein:

said signer's signature-related information is stored into said user header information of the original stream data.

11. The non-transitory computer-readable storage medium according to claim 9, the process comprising:

when an extractor extracts cut-out stream data from the original stream data, generating deleted route hash information for each information part deleted by extraction after adding the content of a nearest sequence header when no sequence header is added to the information part, preparing the extractor's digital signature for said deleted route hash information, and preparing said extractor's signature-related information by combining said deleted route hash information and the extractor's digital signature.

12. The non-transitory computer-readable storage medium according to claim 11, the process comprising:

assigning as the sequence header of the cut-out stream data including the content of the sequence header of the original stream data, and storing the extractor's signature-related information into the user header information of the sequence header of these cut-out stream data.

13. The non-transitory computer-readable storage medium according to claim 12, the process comprising:

preparing and storing additional information for the cut-out stream data.

14. The non-transitory computer-readable storage medium according to claim 12, the process comprising:

taking out the signer's signature-related information and the extractor's signature-related information from the cut-out stream data, and restoring the route hash information of the original stream data contained in the signer's signature-related information and the deleted route hash information of the cut-out stream data contained in the extractor's signature-related information to verify originality.

15. The non-transitory computer-readable storage medium according to claim 1, wherein:

said signature information is PIAT signature information.

16. A method of processing partial content cut-out of streaming data, the method comprising:

preparing signature information for the streaming data;

partitioning a sequence header of the streaming data into stream header information needed for reproduction of the streaming data and user header information in which a user can store desired information; and storing, by a computer, insert data indicating a start of the signature information of a partial content that is cut-out of the streaming data within said user header information so that a start code is kept out of the signature information; and verifying the partial content cut-out of the streaming data using the signature information of the partial content stored in said user header information.

17. A signature management apparatus managing partial content cut-out of streaming data, comprising:

a storage device configured to store signature information for streaming data; and a processor to execute an operation including:

acquiring the signature information from the storage device, partitioning a sequence header of the streaming data into stream header information needed for reproduction of the streaming data and user header information in which a user can store desired information, and storing insert data indicating a start of the signature information of a partial content that is cut-out of the streaming data within said user header information so that a start code is kept out of the signature information, and wherein the partial content cut-out of the streaming data is verified using the signature information of the partial content stored in said user header information.

18. The method according to claim 16, comprising:

adding a start code value indicating storage of the insert data to a terminal end of said user header information.

19. The method according to claim 16, comprising:

generating signature-related information including said sequence header cleared of the user header information when said user header information is not included in an object of originality verification.

20. The method according to claim 16, comprising:

splitting original stream data into a plurality of information parts, generating hash information for each information part after adding content of a nearest sequence header when no sequence header is added to the information part, preparing a signer's digital signature for one unit of route hash information obtained from units of hash information, and preparing the signer's signature-related information by combining the route hash information and the signer's digital signature.

\* \* \* \* \*